US012015258B2

(12) United States Patent
Korcz et al.

(10) Patent No.: US 12,015,258 B2
(45) Date of Patent: Jun. 18, 2024

(54) ELECTRICAL BOX CABLE CONNECTOR

(71) Applicant: Hubbell Incorporated, Shelton, CT (US)

(72) Inventors: Krzysztof Korcz, Shelton, CT (US); Steven Johnson, Shelton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 18/108,469

(22) Filed: Feb. 10, 2023

(65) Prior Publication Data
US 2023/0198238 A1 Jun. 22, 2023

Related U.S. Application Data

(63) Continuation of application No. 16/185,929, filed on Nov. 9, 2018, now Pat. No. 11,581,719, which is a continuation of application No. 15/893,761, filed on Feb. 12, 2018, now Pat. No. 10,158,216, which is a continuation of application No. 15/341,891, filed on Nov. 2, 2016, now Pat. No. 9,929,551.

(60) Provisional application No. 62/249,680, filed on Nov. 2, 2015.

(51) Int. Cl.
H02G 3/16 (2006.01)
H02G 3/06 (2006.01)
H02G 3/08 (2006.01)

(52) U.S. Cl.
CPC ............ *H02G 3/16* (2013.01); *H02G 3/0691* (2013.01); *H02G 3/083* (2013.01); *H02G 3/086* (2013.01)

(58) Field of Classification Search
CPC ...................................................... H02G 3/069
See application file for complete search history.

(56) References Cited

U.S. PATENT DOCUMENTS

| 1,760,663 | A | * | 5/1930 | Rosenfield | ........... H02G 3/0683 285/154.3 |
| 1,822,128 | A | * | 9/1931 | Clayton | ............... H02G 3/0683 16/108 |
| 2,391,761 | A | * | 12/1945 | Winn | ...................... F16L 25/08 411/965 |
| 2,708,122 | A | | 5/1955 | Clark | |
| 2,973,212 | A | | 2/1961 | Rose | |
| 3,783,176 | A | | 1/1974 | Lund | |
| 3,858,151 | A | | 12/1974 | Paskert | |
| 4,012,578 | A | | 3/1977 | Moran et al. | |
| 4,304,957 | A | | 12/1981 | Slater et al. | |
| 4,350,839 | A | | 9/1982 | Lass | |
| 4,414,427 | A | | 11/1983 | Slater et al. | |
| 4,880,387 | A | | 11/1989 | Stikeleather et al. | |

(Continued)

OTHER PUBLICATIONS

International Search Report and Written Opinion mailed in PCT/US2016/060143 dated Apr. 7, 2017 (14 pages).

(Continued)

*Primary Examiner* — Krystal Robinson
(74) *Attorney, Agent, or Firm* — Wissing Miller LLP

(57) ABSTRACT

An electrical box assembly and cable connector are provided. The cable connector includes a connector housing and a cable retaining member that releasably secures an electrical cable within the connector housing. The electrical box assembly includes an electrical box and a cable connector. The electrical box assembly may also include a box separator.

19 Claims, 22 Drawing Sheets

(56) References Cited

U.S. PATENT DOCUMENTS

| | | | |
|---|---|---|---|
| 4,970,350 A | 11/1990 | Harrington | |
| 4,990,721 A | 2/1991 | Sheehan | |
| 5,013,872 A * | 5/1991 | Lockwood | H02G 3/0675 |
| | | | 174/663 |
| 5,171,164 A | 12/1992 | O'Neil et al. | |
| 5,241,136 A | 8/1993 | Michaelis et al. | |
| 5,422,437 A | 6/1995 | Schnell | |
| 5,594,207 A | 1/1997 | Fabian et al. | |
| 5,789,706 A | 8/1998 | Perkins | |
| 6,020,557 A | 2/2000 | Jorgensen | |
| 6,043,432 A | 3/2000 | Gretz | |
| 6,064,009 A * | 5/2000 | Jorgensen | H02G 15/013 |
| | | | 174/40 CC |
| 6,080,933 A | 6/2000 | Gretz | |
| 6,091,023 A | 7/2000 | O'Donnell | |
| 6,100,470 A | 8/2000 | Gretz | |
| 6,139,369 A | 10/2000 | Arwidi et al. | |
| 6,335,488 B1 | 1/2002 | Gretz | |
| 6,395,981 B1 | 5/2002 | Ford et al. | |
| 6,444,907 B1 | 9/2002 | Kiely | |
| 6,604,400 B1 | 8/2003 | Gretz | |
| 6,670,553 B1 | 12/2003 | Gretz | |
| 6,682,355 B1 | 1/2004 | Gretz | |
| 6,709,280 B1 | 3/2004 | Gretz | |
| 6,780,029 B1 | 8/2004 | Gretz | |
| 6,827,604 B1 | 12/2004 | White | |
| 6,849,803 B1 | 2/2005 | Gretz | |
| 7,154,054 B1 | 12/2006 | Gretz | |
| 7,238,894 B1 | 7/2007 | Gretz | |
| 7,304,251 B1 | 12/2007 | Gretz | |
| 7,329,144 B1 | 2/2008 | Gretz | |
| 7,390,979 B1 | 6/2008 | Johnson | |
| 7,495,184 B1 | 2/2009 | Gretz | |
| 7,576,290 B1 | 8/2009 | Korcz | |
| 7,645,947 B2 | 1/2010 | Kiely et al. | |
| 7,824,213 B1 | 11/2010 | Korcz et al. | |
| 8,124,891 B1 | 2/2012 | Gretz | |
| 8,646,813 B1 | 2/2014 | Shemtov | |
| 8,759,674 B2 | 6/2014 | Korcz et al. | |
| 8,791,374 B1 | 7/2014 | Smith | |
| 8,857,039 B2 | 10/2014 | Sathyanarayana et al. | |
| 9,231,388 B2 | 1/2016 | Chavan et al. | |
| 9,247,662 B2 | 1/2016 | Korcz et al. | |
| 9,252,578 B2 | 2/2016 | Korcz et al. | |
| 9,553,432 B2 | 1/2017 | Korcz et al. | |
| 9,559,506 B2 | 1/2017 | Korcz et al. | |
| 9,614,358 B2 | 4/2017 | Korcz et al. | |
| 9,762,042 B2 | 9/2017 | Korcz et al. | |
| RE47,893 E | 3/2020 | Chavan | |
| 10,601,189 B1 | 3/2020 | Smith | |
| 2006/0289194 A1 | 12/2006 | Kiely et al. | |
| 2009/0205865 A1 | 8/2009 | Korcz | |
| 2010/0000756 A1 | 1/2010 | Peck | |
| 2011/0204619 A1 | 8/2011 | Sathyanarayana et al. | |
| 2011/0209913 A1 | 9/2011 | Green et al. | |
| 2014/0262486 A1 | 9/2014 | Korcz et al. | |
| 2014/0262488 A1 | 9/2014 | Korcz et al. | |
| 2015/0357806 A1 | 12/2015 | Korcz et al. | |
| 2016/0099554 A1 | 4/2016 | Korcz et al. | |
| 2016/0105011 A1 | 4/2016 | Korcz et al. | |
| 2017/0207571 A1 | 7/2017 | Korcz et al. | |
| 2019/0115736 A1 * | 4/2019 | Korcz | H02G 3/0691 |

OTHER PUBLICATIONS

International Preliminary Report on Patentability mailed in PCT/US2016/060143 dated May 7, 2018 (10 pages).

* cited by examiner

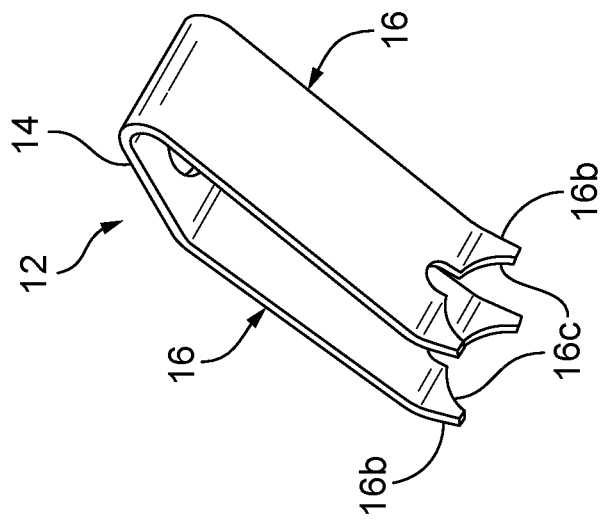
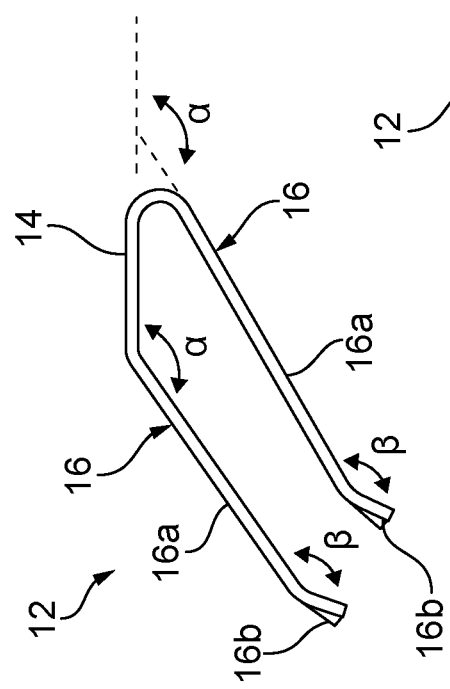
FIG. 3
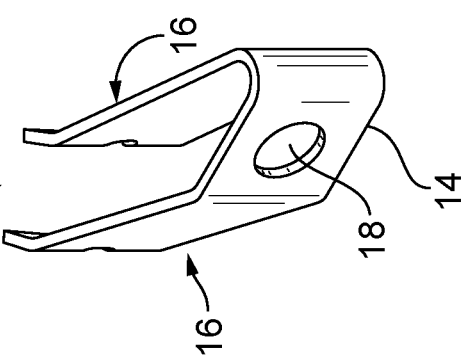
FIG. 4
FIG. 5

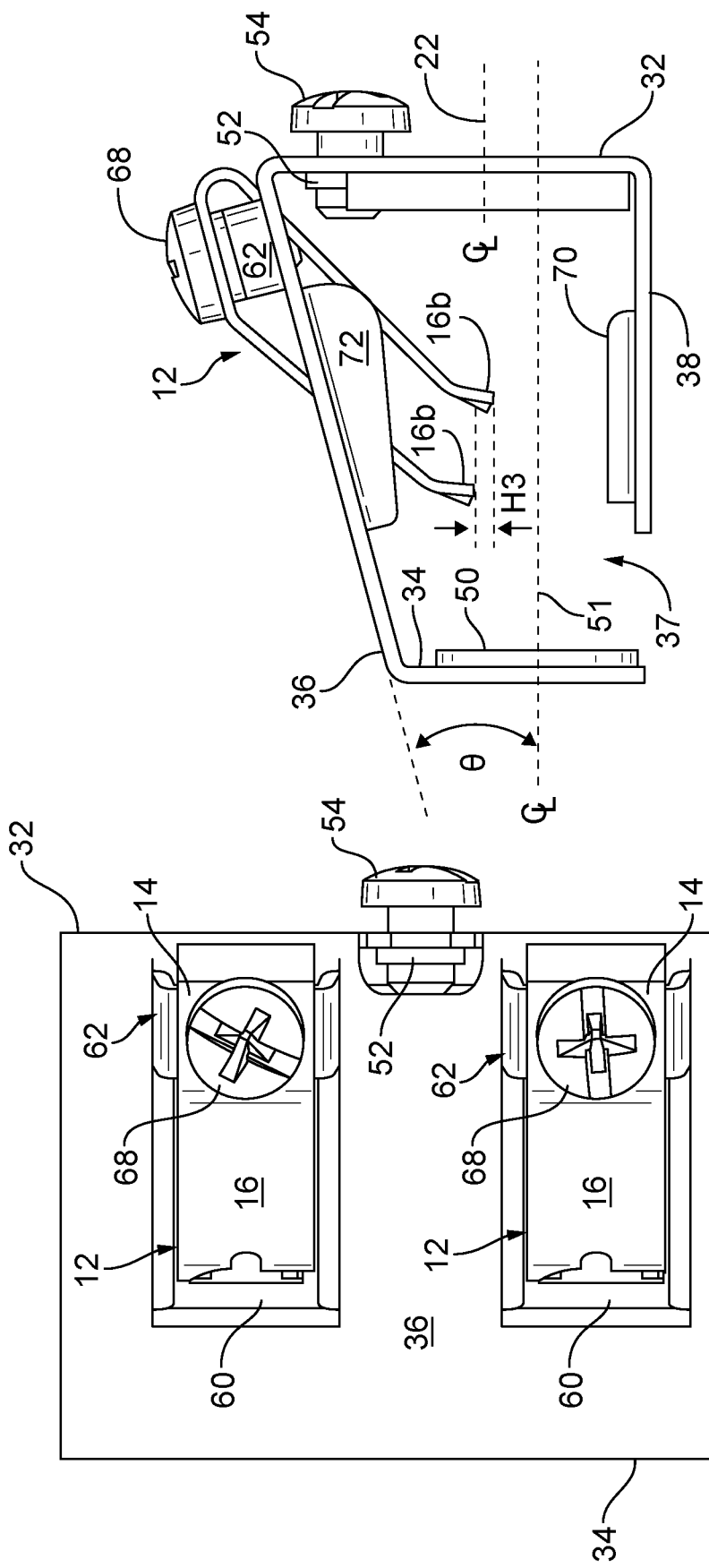

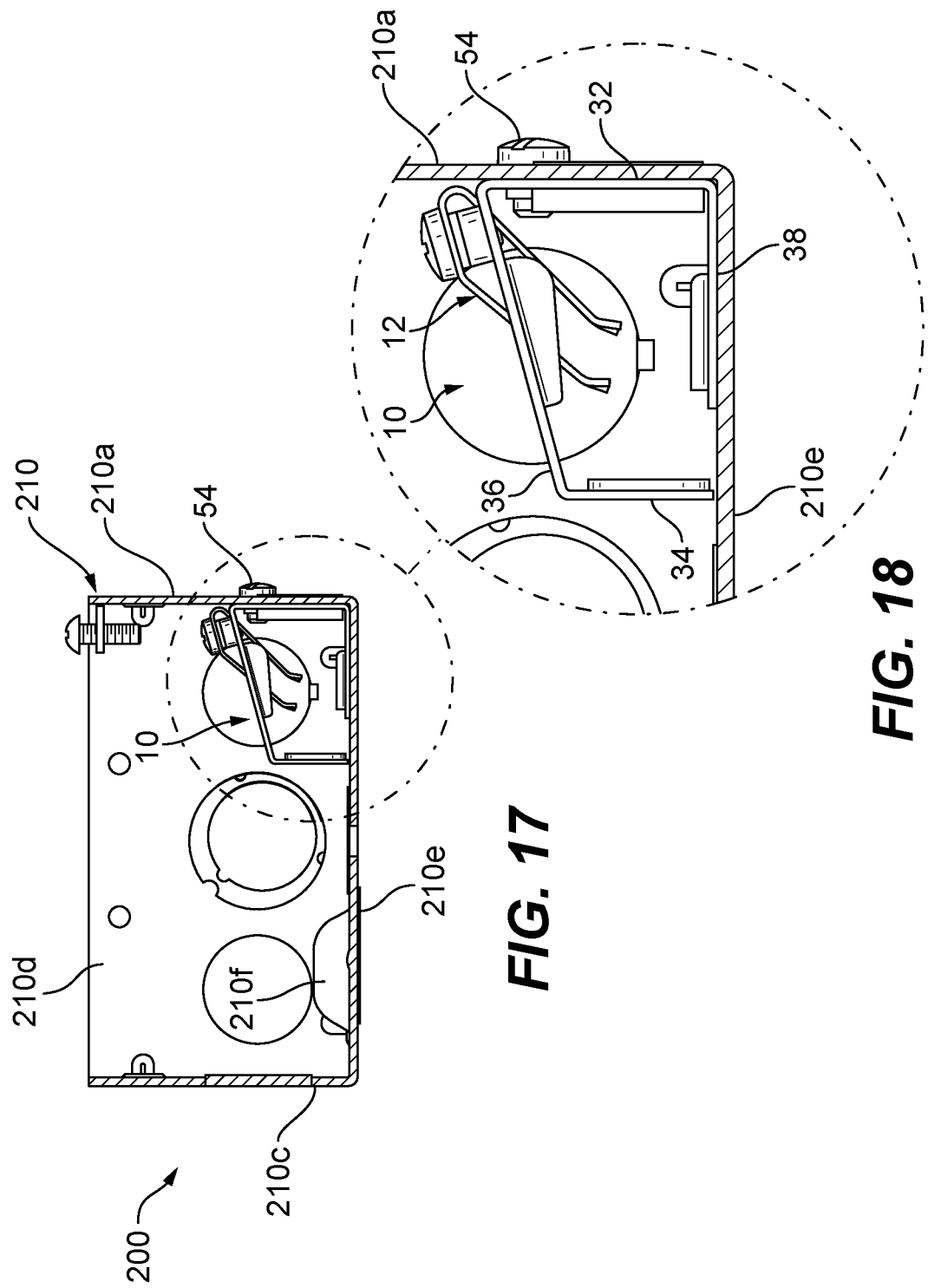

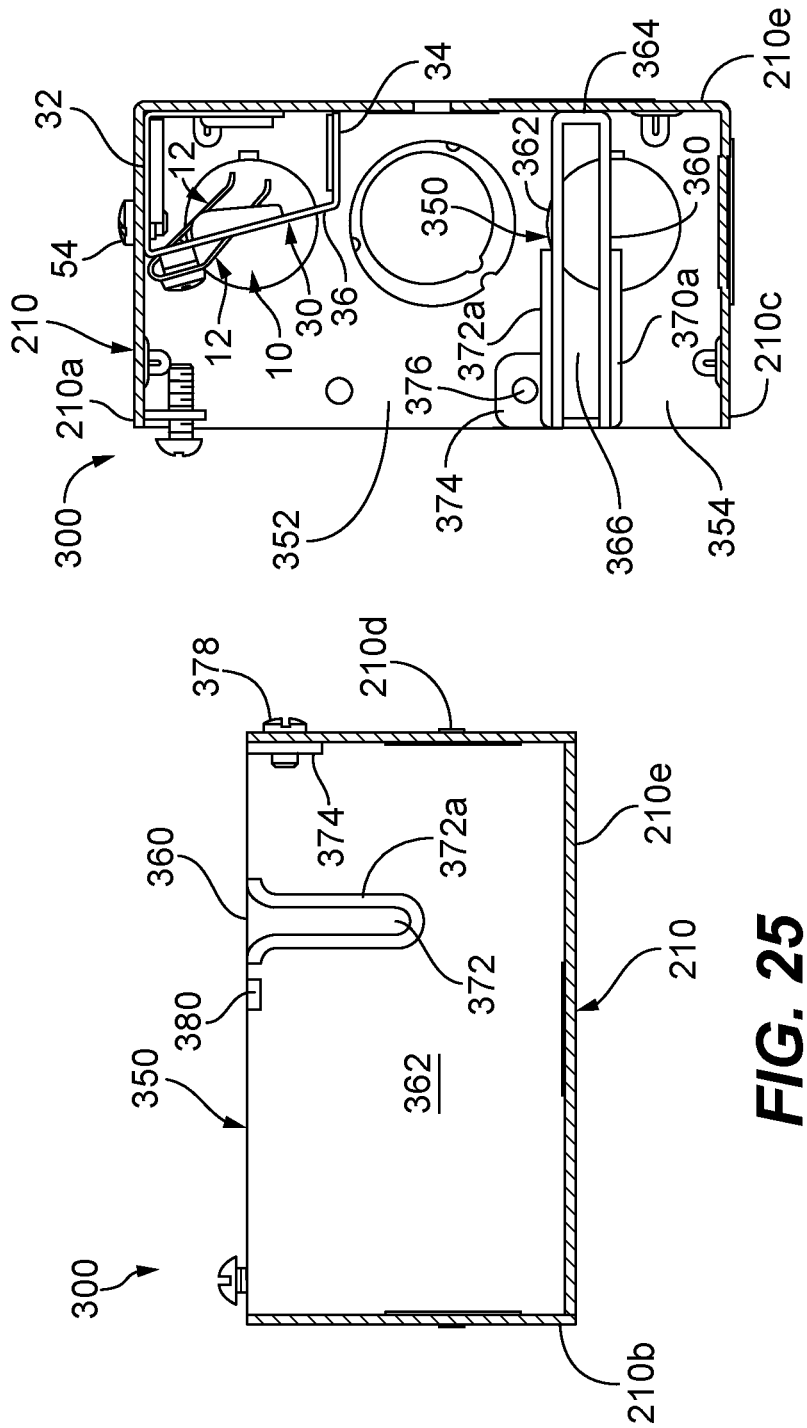

ELECTRICAL BOX CABLE CONNECTOR

CROSS REFERENCE TO RELATED APPLICATIONS

This application is a continuation of co-pending application Ser. No. 16/185,929, filed Nov. 9, 2018, which is a continuation of application Ser. No. 15/893,761, filed Feb. 12, 2018 (now U.S. Pat. No. 10,158,216), which is a continuation of application Ser. No. 15/341,891, filed Nov. 2, 2016 (now U.S. Pat. No. 9,929,551), which claims priority to U.S. Provisional Application Ser. No. 62/249,680 filed Nov. 2, 2015, the contents of each are incorporated herein in their entirety by reference.

BACKGROUND

Field

The present disclosure relates generally to electrical box assemblies for electrical cables, and cable connectors installed within the electrical box assemblies.

Description of the Related Art

Electrical boxes are mounted in various residential, commercial, and industrial locations depending on the particular application. Electrical cables are commonly supplied to such electrical boxes and are used for connecting a cable to electrical devices or fixtures or other electrical cables. Current electrical codes typically require electrical cabling to be secured to the electrical boxes. In some electrical box configurations, the electrical cables generally pass through an opening in a wall of an electrical box, also known as a knock-out or a pry-out, and are secured in place by a cable connector or clamp. Conventional cable clamps for armored sheathed cabling differ from cable clamps for non-metallic sheathed cabling, but in either case, such conventional cable clamps generally clamp the cable between a clamping plate and a side wall or bottom wall of the electrical box. Conventional cable clamps for armored sheathed cabling, typically include a stop member to prevent the armored sheath from extending too far into the electrical box.

SUMMARY

The present disclosure provides an electrical cable connector comprising a connector housing and a cable retaining member. The connector housing has a front wall, a rear wall, and a top wall between the front wall and the rear wall. The front wall, rear wall and top wall form a cavity. The front wall includes at least one cable opening dimensioned to permit an electrical cable to pass into the cavity, and the rear wall includes at least one wire opening that permits electrical wires within an electrical cable to exit the cavity while preventing the electrical cable from exiting the cavity. The cable retaining member secured to the connector housing and having at least a portion extending into the cavity such that the portion extending into the cavity can engage a cable within the cavity so that the cable retaining member is able to flex while an electrical cable passes into the cavity imparting little resistance to the forward advancement of the cable, while imparting sufficient resistance to rearward movement of the cable to prevent withdrawal of the cable from the cavity.

The present disclosure also provides an electrical box assembly comprising an electrical box and at least one cable connector. The electrical box has four sides and a bottom, and the at least one cable connector is releasably secured within the electrical box. The at least one cable connector comprises a connector housing having a front wall, a rear wall, and a top wall between the front wall and the rear wall, wherein the front wall, rear wall and top wall form a cavity. The front wall includes at least one cable opening dimensioned to permit an electrical cable to pass into the cavity, and the rear wall includes at least one wire opening that permits electrical wires within an electrical cable to exit the cavity while preventing the electrical cable from exiting the cavity. The at least on cable connector also includes a cable retaining member secured to the connector housing. The cable retaining member has at least a portion extending into the cavity such that the portion extending into the cavity can engage a cable within the cavity so that the cable retaining member is able to flex while an electrical cable passes into the cavity imparting little resistance to the forward advancement of the cable, while imparting sufficient resistance to rearward movement of the cable to prevent withdrawal of the cable from the cavity. In some configurations, the electrical box assembly may include a box separator secured within the electrical box and configured to create at least two isolated compartments within the electrical box.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein:

FIG. 3 is a side elevation view of an exemplary embodiment of a retaining member of the cable connector of FIG. 2;

FIG. 4 is a perspective view from the bottom of the retaining member of FIG. 3;

FIG. 5 is a perspective view from a top surface of the retaining member of FIG. 3;

FIG. 9 is a top plan view of the cable connector of FIG. 2;

FIG. 10 is a side elevation view of the cable connector of FIG. 2;

FIG. 17 is a cross-sectional view of the electrical box assembly of FIG. 14 taken along line 17-17;

FIG. 18 is an enlarged view of a portion of the electrical box assembly of FIG. 17, illustrating a cable connector secured to the electrical box;

FIG. 25 is a cross-sectional view of the electrical box assembly of FIG. 24 taken along line 25-25;

FIG. 26 is a cross-sectional view of the electrical box assembly of FIG. 24 taken along line 26-26;

DETAILED DESCRIPTION

The present disclosure provides descriptions of embodiments for electrical cable connectors used in electrical boxes, and electrical box assemblies incorporating such electrical cable connectors. The specification and drawings are to be regarded in an illustrative sense rather than a restrictive sense. Various modifications may be made thereto without departing from the spirit and scope of the present disclosure.

Figure 1:
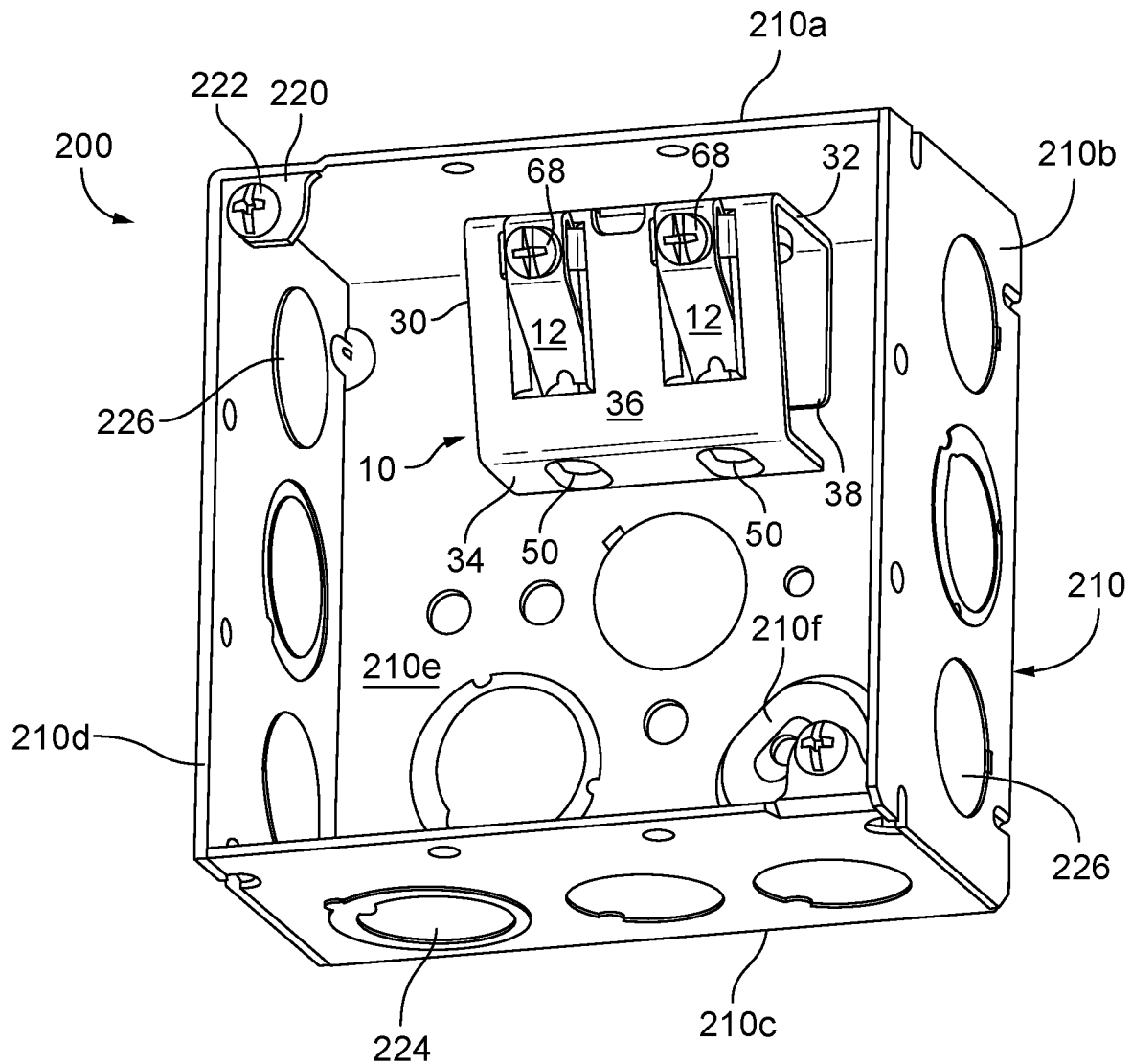
FIG. 1 is a perspective view of an exemplary embodiment of an electrical box assembly according to the present disclosure, illustrating an electrical box and a cable connector.
Figure 2:
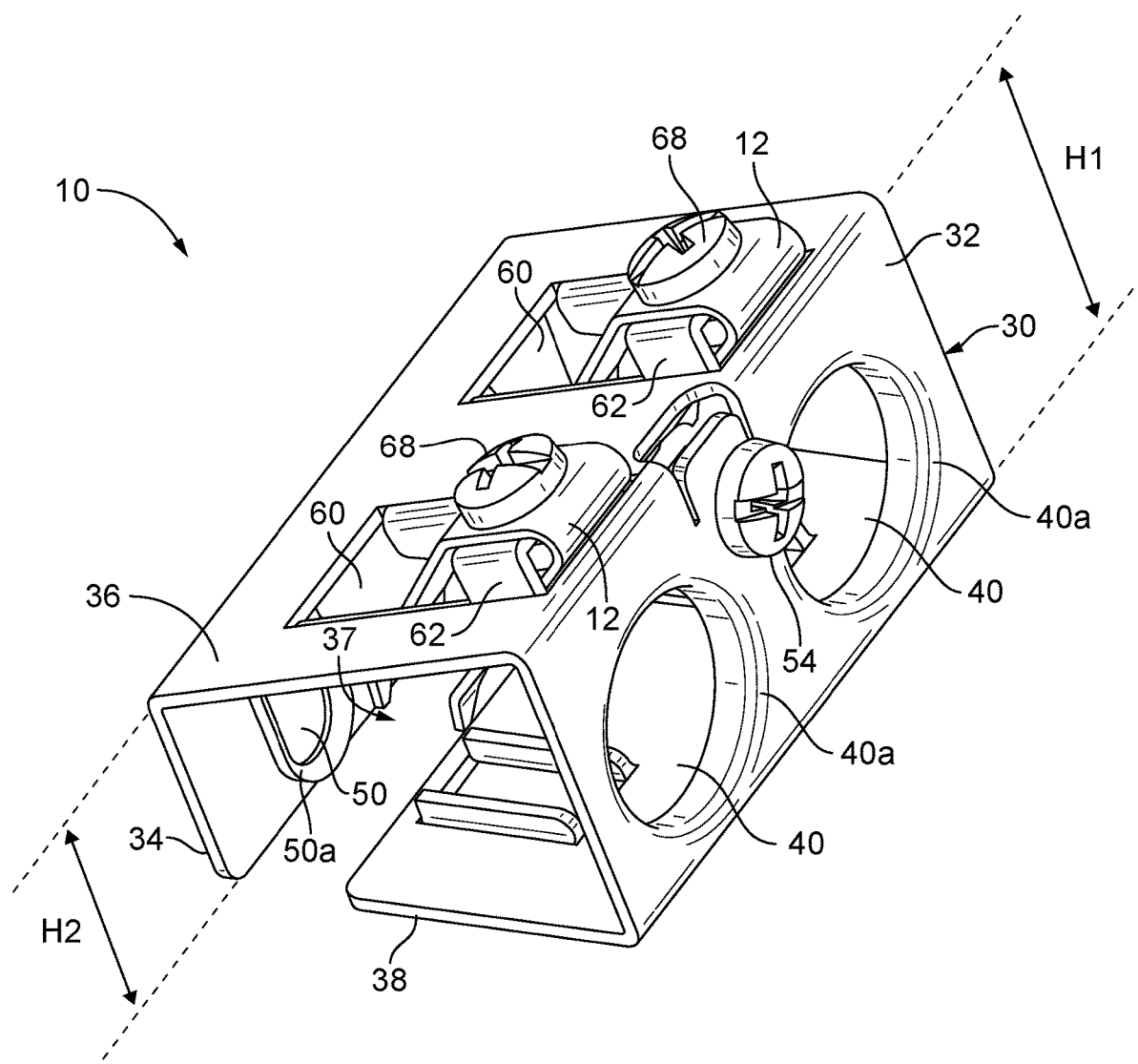
FIG. 2 is a top perspective view of an exemplary embodiment of a cable connector according to the present disclosure.

Referring to FIG. 1, an exemplary embodiment of an electrical box assembly according to the present disclosure is shown. In this exemplary embodiment, the electrical box assembly 200 includes a cable connector 10 (also referred to as a cable clamp) installed within an electrical box 210.

Referring to FIGS. 2-13, an exemplary embodiment of a cable connector according to the present disclosure is shown. In this exemplary embodiment, the cable connector 10 includes one or more cable retaining members 12 that are releasably secured to a connector housing 30. In another embodiment, the cable retaining members 12 may be integrally formed into the connector housing. The retaining member 12 is a flexible member that is able to flex (typically upwards) while an electrical cable passes into the connector housing 30 imparting little resistance to the forward advancement of the cable within the connector housing while imparting sufficient resistance to rearward movement of the cable to prevent withdrawal of the cable from the connector housing.

The retaining member 12 may be provided in various shapes and sizes sufficient to flex while an electrical cable passes into the connector housing 30 imparting little resistance to the forward advancement of the cable while imparting sufficient resistance to rearward movement of the cable to prevent withdrawal of the cable from the connector housing 30. Referring to FIGS. 3-5, an exemplary embodiment of the retaining member 12 includes a base portion 14 and at least one leg 16 extending from the base portion 14. The base portion 14 is generally straight and includes an aperture 18 used in securing the retaining member 12 to the connector housing 30. In an embodiment where the cable retaining member 12 is integrally formed into the connector housing 30, the base portion 14 of the cable retaining member 12 would be integral with the connector housing and the legs 16 would extend from the connector housing.

The leg 16 has a substantially straight main body 16a that extends from the base portion 14 at an angle "α", and an end portion 16b that is at an angle "β" relative to the main body 16a. As such, the leg 16 is cantilevered from the base portion 14 at the point where the base portion 14 connects to the leg 16. This cantilever permits flexibility of the leg 16 relative to the base portion 14, which is secured to the connector housing 30. The angle "α" may depend upon a number of factors, including, the length of the leg portion 16 of each retaining member 12, and the angle between the base portion 14 and a central axis 22 of the connector housing 30, seen in FIG. 10. As an example, the angle "α" can be 145 degrees, which provides suitable flexibility of the retaining member to allow insertion of a cable into the connector housing while imparting sufficient resistance to rearward movement of the cable to prevent withdrawal of the cable from the connector housing 30. The angle "β" may depend upon a number of factors, including the angle "α" and the angle between the base portion 14 and the central axis 22 of the connector housing 30. As an example, the angle "β" can be 145 degrees. The end portion 16b of leg 16 may include an arcuate portion 16c that is configured to substantially conform to an outer periphery of the sheathing of an electrical cable, and to engage the sheathing of the electrical cable, as will be described below.

In the exemplary embodiment shown in FIGS. 3-5, the retaining member 12 has two legs 16. Each leg 16 is connected to an end of the base portion 14 as shown. The legs 16 are secured to the base portion 14 so that the long surfaces of each leg 16 are in parallel, and capable of flexing while an electrical cable passes into the connector housing 30 imparting little resistance to the forward advancement of the cable. The end portion 16b of the leg 16 engages the cable to impart sufficient resistance to rearward movement of the cable to prevent withdrawal of the cable from the housing. The retaining member 12 may be made of metal, e.g., steel or galvanized steel, or from non-metallic materials, such as plastic. An example of a suitable plastic material is injection molded thermoplastic. The retaining member 12 may be made as a single unitary member bent or stamped to a desired size and shape, or the retaining member 12 may comprise a plurality of components joined together with, for example, welds to a size and shape sufficient to retain a cable within the connector housing 30.

Referring again to FIGS. 6-13, the connector housing 30 has a front wall 32, a rear wall 34, a top wall 36 extending between the front wall 32 and the rear wall 34, and a bottom wall 38 connected to the front wall 32. The front wall 32 and the rear wall 34 of the connector housing 30, in the implementation shown in FIG. 1 for example, are configured such that they are oriented substantially parallel to a side wall, e.g., side wall 210a, of an electrical box 210. The front wall 32 and rear wall 34 extend downwardly from the top wall 36, and the bottom wall 38 extends from the front wall 32 toward the rear wall 34 to form an internal cavity 37 with a partially open bottom end. However, one skilled in the art would readily appreciate that the bottom wall may extend from the front wall 32 to the rear wall 34. In another embodiment, the housing 30 may also include side walls (not shown) extending between the front wall 32 and the rear wall 34 and from the top wall 36 to or toward the bottom wall 38.

Figure 7:
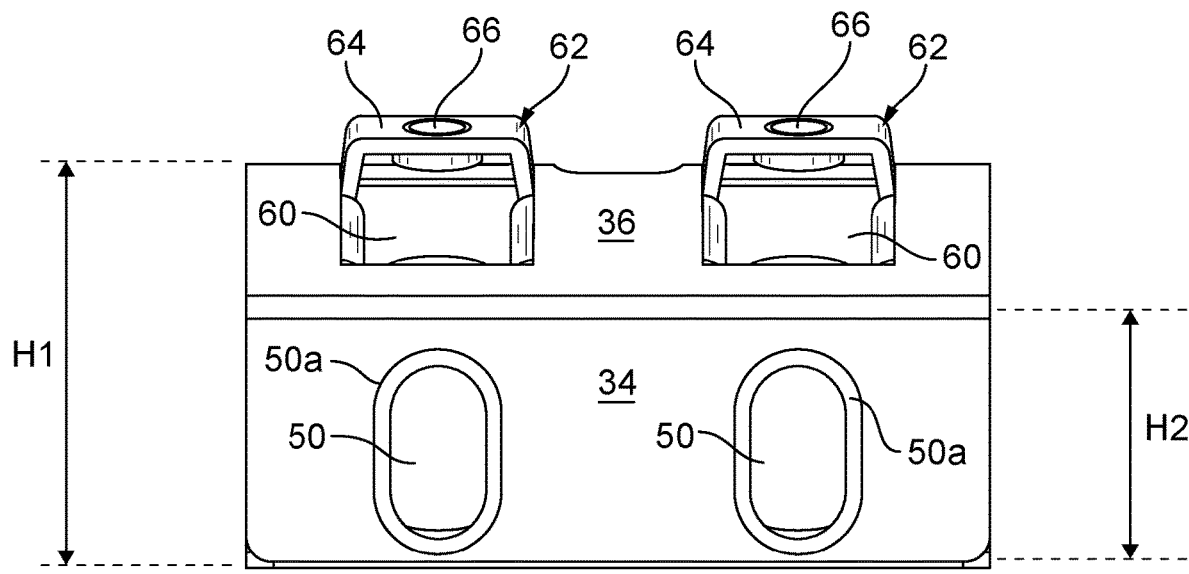
FIG. 7 is a rear elevation view of the connector housing of FIG. 6.
Figure 8:
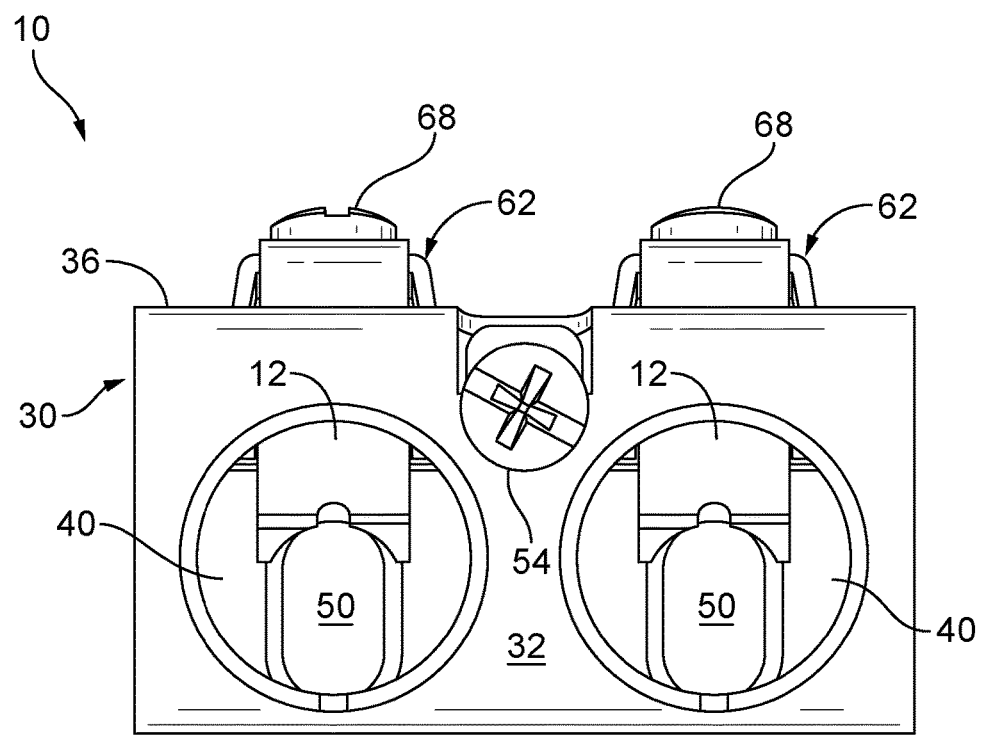
FIG. 8 is a front elevation view of the cable connector of FIG. 2.
Figure 11:
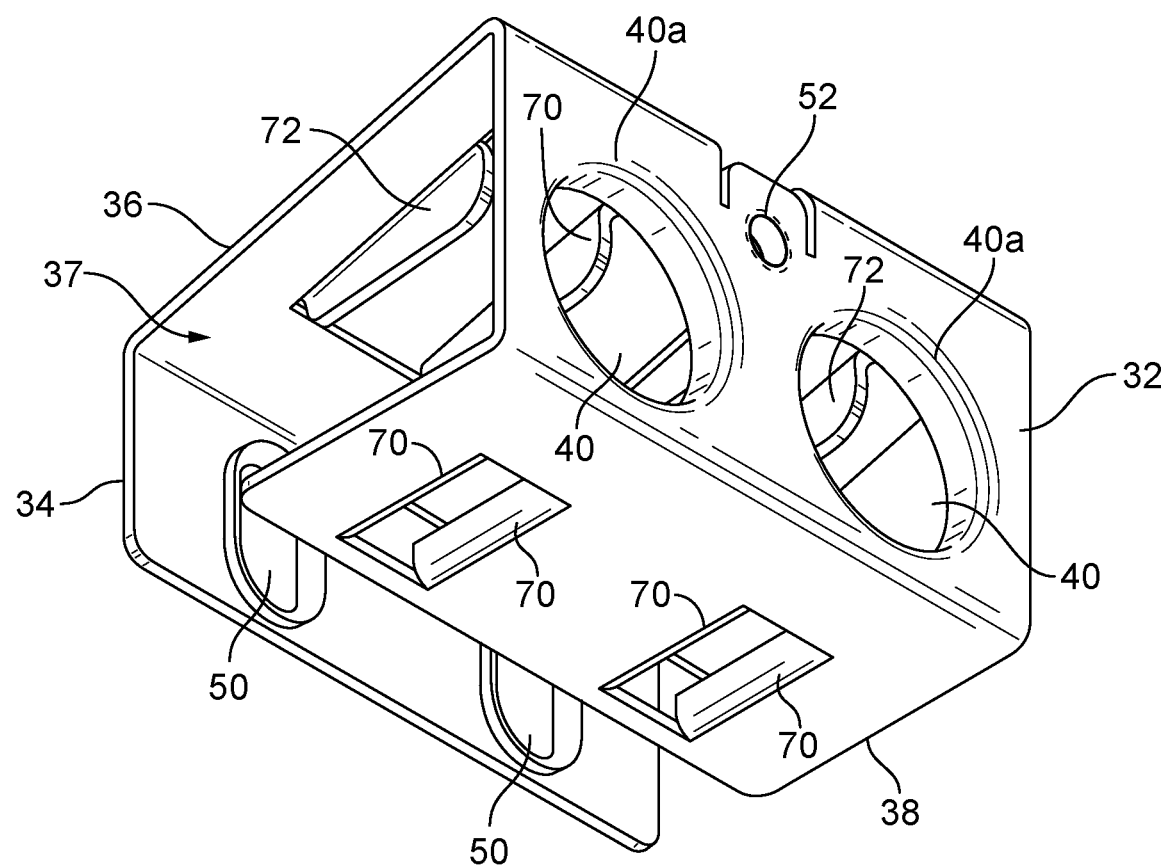
FIG. 11 is a bottom perspective view of the connector housing of FIG. 6.
Figure 12:
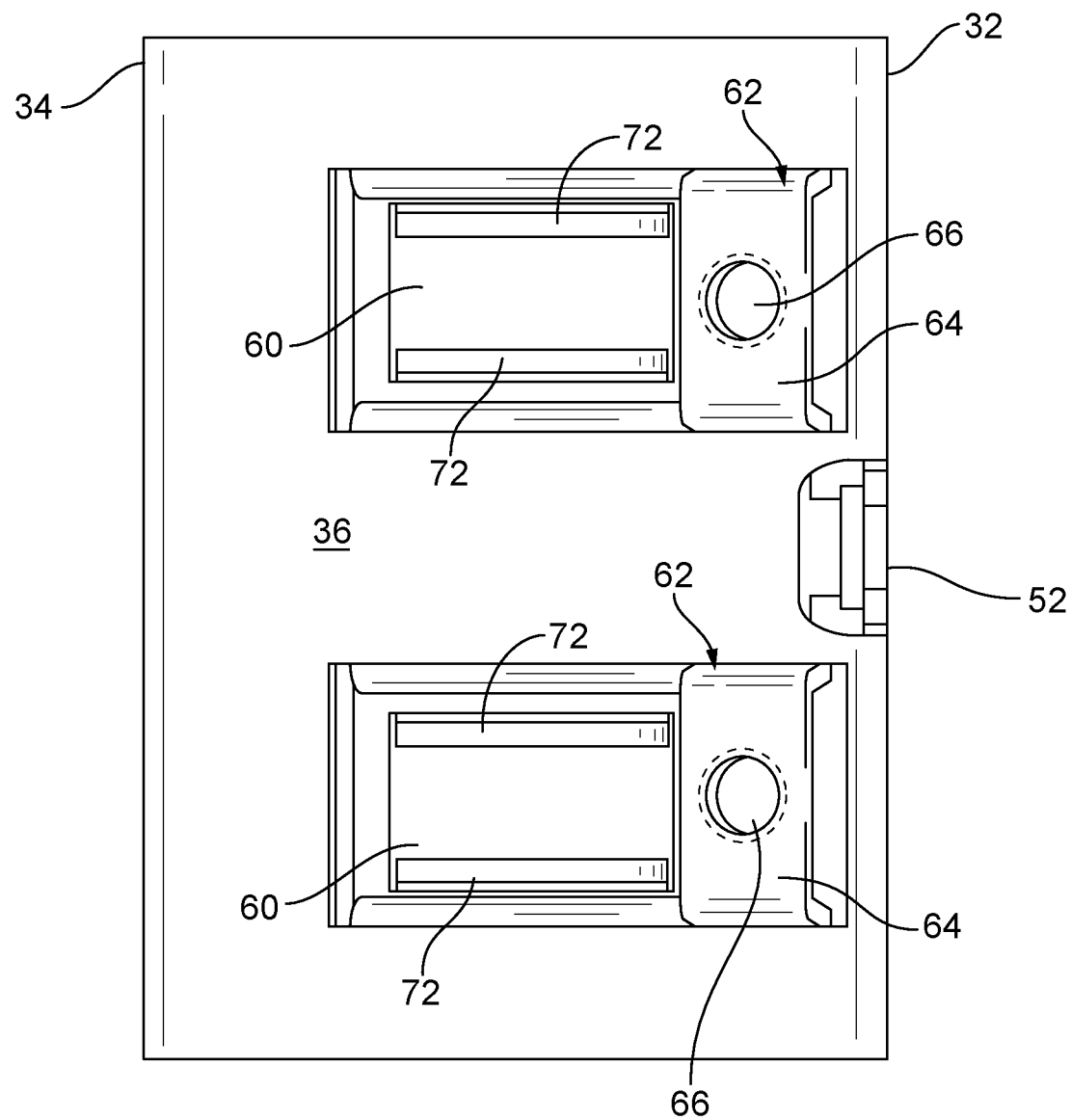
FIG. 12 is a top plan view of the connector housing of FIG. 6.
Figure 13:
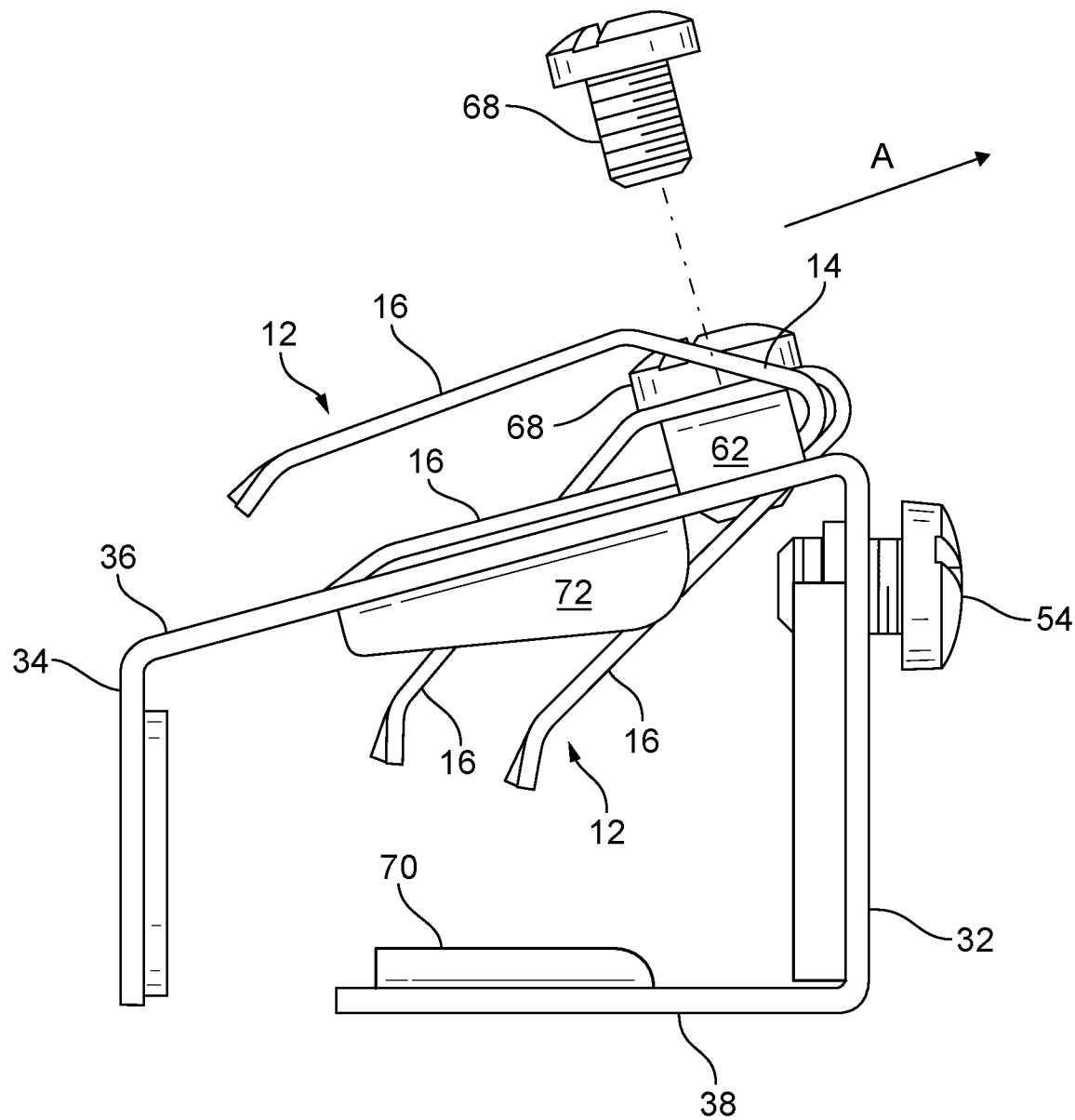
FIG. 13 is a side elevation view of the cable connector of FIG. 2, illustrating motion for removing a retainer member from the connector housing.

In FIGS. 7 and 10, the height "H1" of the front wall 32 is typically greater than the height "H2" of the rear wall 34, such that the top wall 36 rests at an angle "0" relative to a center line 51 of the wire opening 50 in the rear wall 34. An example of a suitable angle "0" is 15 degrees. While the embodiment shown angles the top wall between the front and rear walls, the present disclosure also contemplates a top wall that can be perpendicular to the front wall and/or the rear wall.

In this exemplary embodiment, the end portion 16b of leg 16 is aligned within the connector housing 30 so that it can flex when a cable is passed into the connector housing 30 and biased toward a normal state when the cable is fully inserted such that the end portion 16b of leg 16 engages the cable sheathing to impart sufficient resistance to rearward movement of the cable so as to prevent withdrawal of the cable from the housing. To accommodate cables having different outside diameters, the legs 16 can be configured so that the end portions 16b can extend into the cavity and end at different locations within the internal cavity 37, such that there is a height difference "H3" between the end portions 16b, as shown in FIG. 10. To remove the cable from the connector housing 30, upward pressure can be applied to the leg 16 of the retaining member 12 so that the end portion 16b no longer engages the cable sheathing.

Referring to FIGS. 1, 2, 6 and 8, the front wall 32 includes one or more cable openings 40 for passing electrical cables external to the electrical box 210 into the internal cavity 37 of the connector housing 30 secured in the electrical box for connection to other wires, or electrical devices or fixtures. In this exemplary embodiment, the front wall 32 has two adjacent cable openings 40. Each cable opening 40 is configured and dimensioned to receive is an electrical cable, such as an armored cable, including BX type cables, MC-PCS type cables, and Greenfield type flexible armored cabling. The size of the cable opening 40 may vary depending upon the outside diameter of the cabling that is to pass through the cable opening 40 into the internal cavity 37 of the connector housing 30. Examples of sizes for the cable opening include, ½ inch, ¾ inch, 1 inch, and sizes greater than 1 inch. However, one skilled in the art would readily recognize that the cable opening 40 may be any size suitable to permit entry of an electrical cable into the connector housing 30. In one exemplary embodiment the cable is a BX type armored cable having an outside diameter of about ½ inch. In such an example, the cable opening 40 would be large enough to receive the BX type armored cable or about ½ inch or greater in size. Each cable opening 40 includes rounded edges 40a to minimize potential damage to cables passing through the cable opening 40. Alternatively, the cable opening 40 can include, for example, a rubber or plastic grommet to minimize potential damage to the cable sheathing surrounding wires passing through the cable opening 40.

Figure 6:
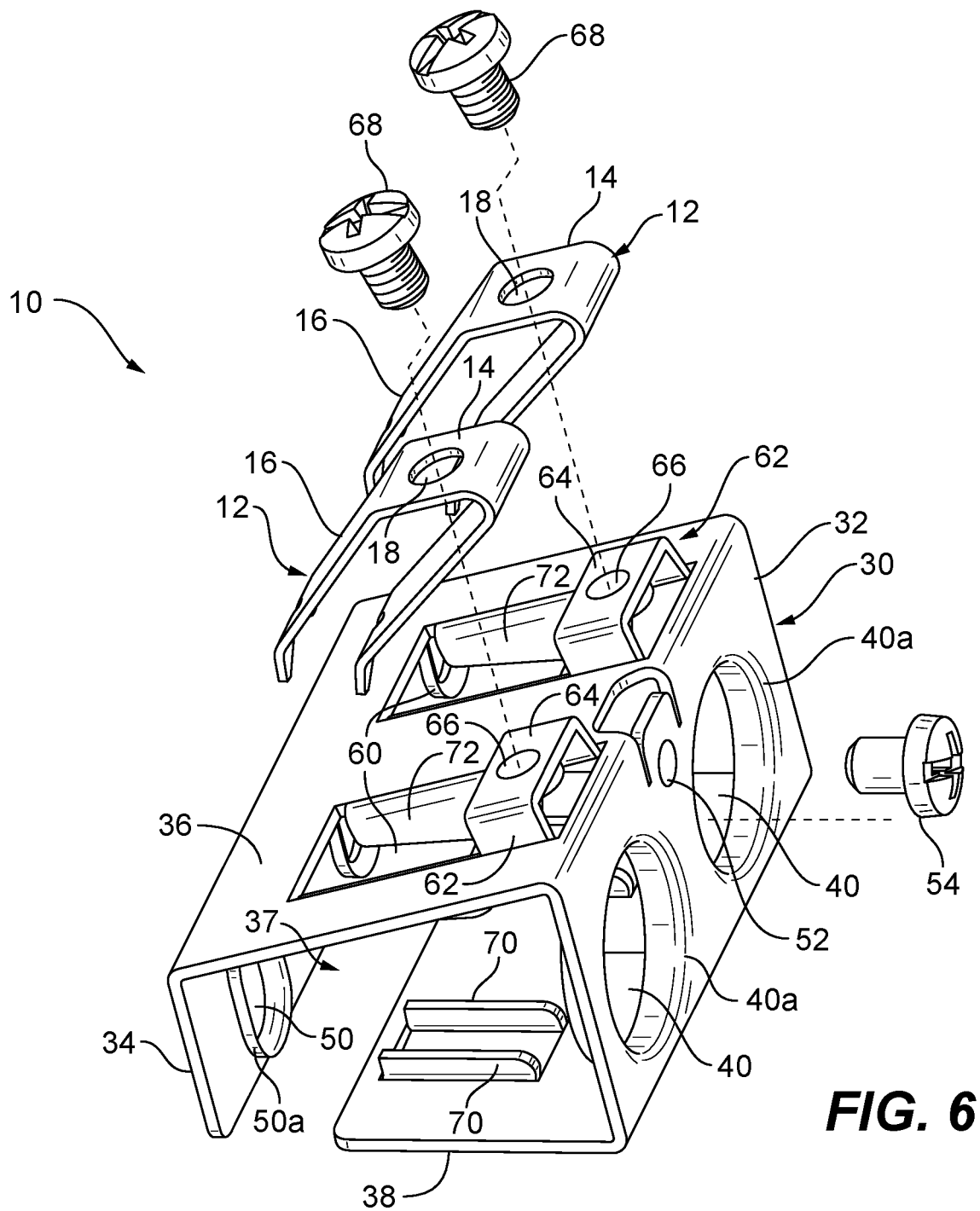
FIG. 6 is an exploded view of the cable connector of FIG. 2, illustrating a connector housing and the retaining member of FIG. 3.
Figure 20:
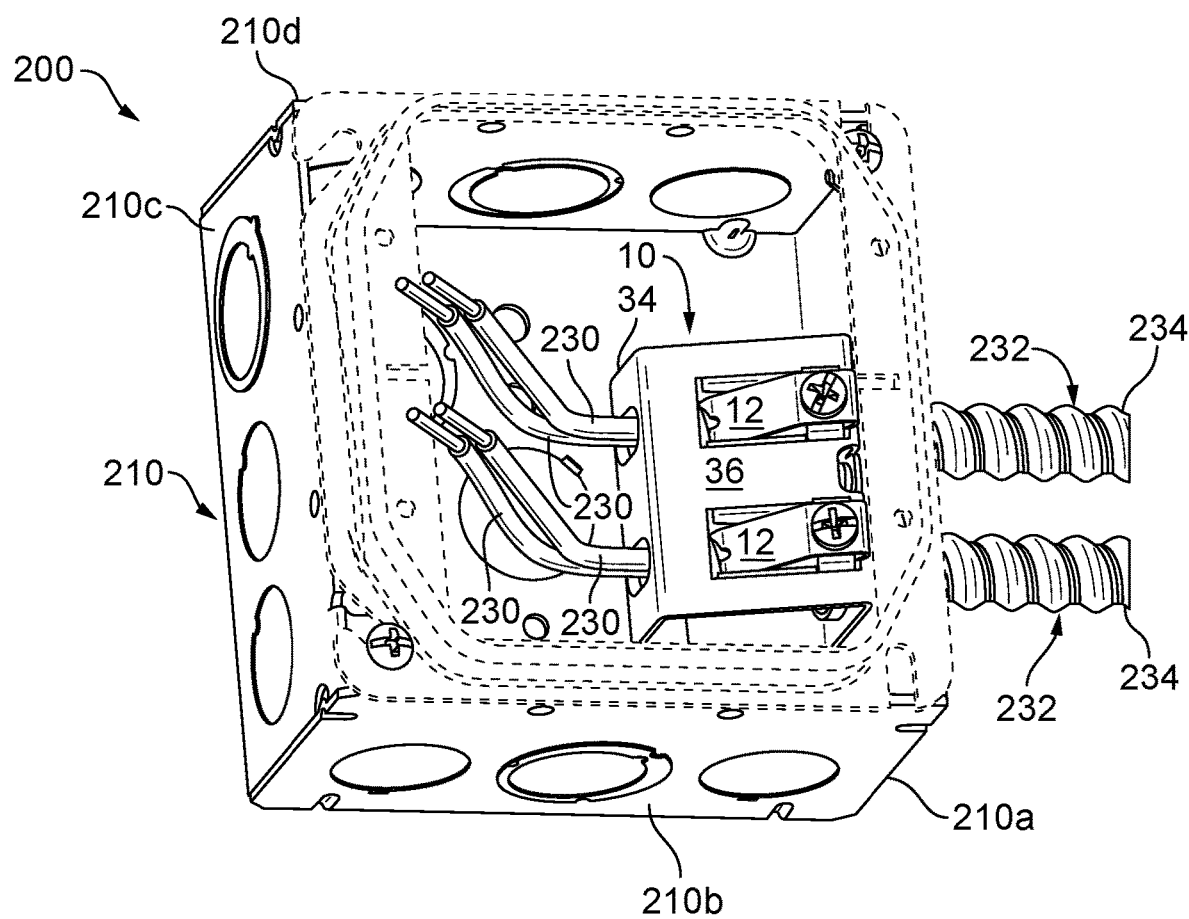
FIG. 20 is a perspective view of an exemplary embodiment of an electrical box assembly according to the present disclosure with a pair of armored sheathed cables secured to a cable connector.
Figure 22:
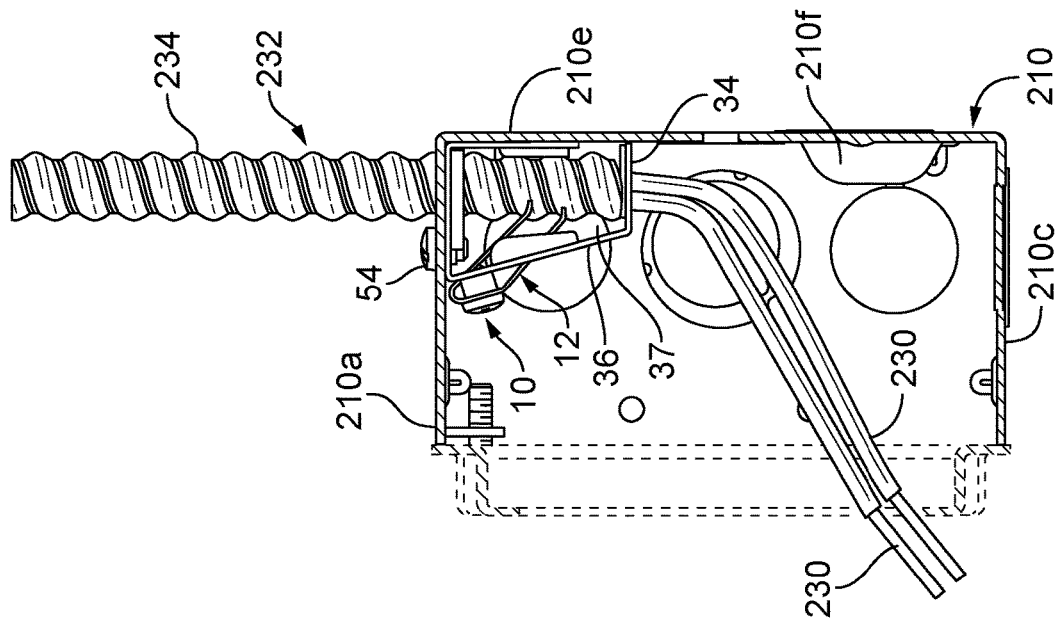
FIG. 22 is a cross-sectional view of the electrical box assembly of FIG. 21 taken along line 22-22.
Figure 21:
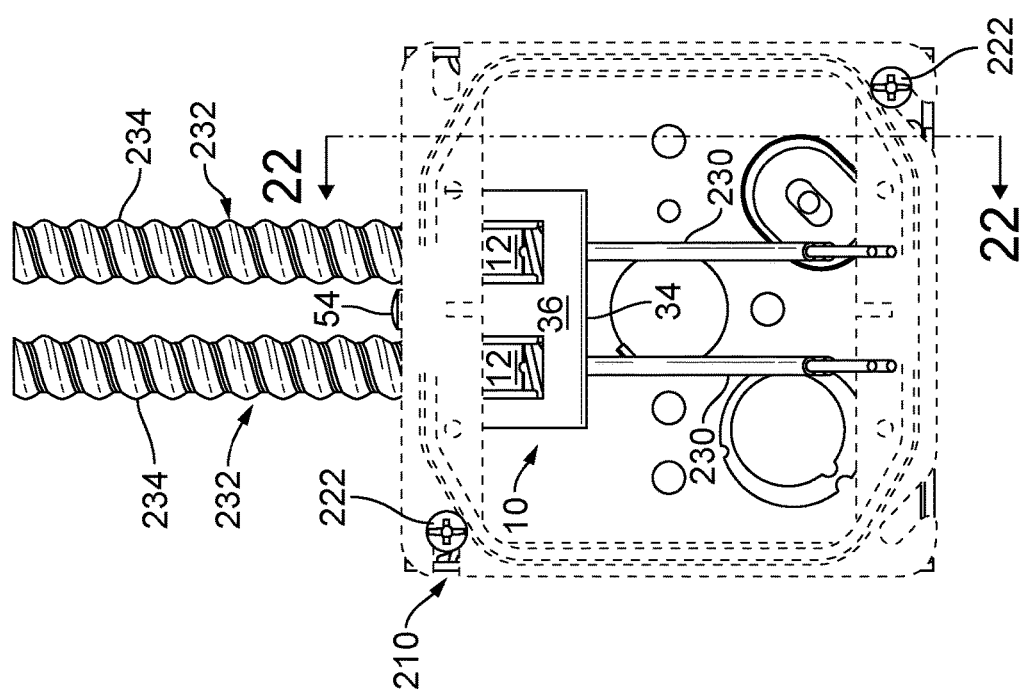
FIG. 21 is a top plan view of the electrical box assembly of FIG. 20.

The front wall 32 is spaced from the rear wall 34 a distance sufficient to receive the cable retaining member 12 and electrical cables 232, shown for example in FIGS. 20-22. The front wall 32 is configured to abut and rest against a side wall, e.g., side wall 210a of an electrical box 210, seen in FIG. 1, and includes a mounting hole 52, e.g., a threaded hole, positioned in a central portion of the front wall 32, as shown in FIG. 6. The mounting hole 52 is used to receive a fastener 54, e.g., a threaded screw, to secure the cable connector 10 to the electrical box 210.

Referring to FIGS. 1, 2, 10 and 11, the rear wall 34 has at least one wire opening 50 for passing electrical wires, e.g., wires 230 seen in FIG. 20, from an electrical cable 232 within the internal cavity 37 of the connector housing 30 into the electrical box 210 for connection to other wires or an electrical device or fixture. In this exemplary embodiment, the rear wall 34 has two adjacent wire openings 50. Each wire opening 50 has a center line 51, seen in FIG. 10, and includes a rounded edge 50a around the periphery of the opening 50 to minimize potential damage to insulation surrounding wires passing through the wire opening 50. Alternatively, the wire opening can include, for example, a rubber or plastic grommet to minimize potential damage to insulation surrounding wires passing through the wire opening 50. The size of the wire opening 50 may vary depending upon a number of factors, including the number of wires within the electrical cable and the diameter of the sheathing of the cable. The rear wall 34 also acts as a stop to prevent the cable sheathing, e.g., armored electrical cable sheathing, from passing through the internal cavity 37 of the connector housing 30 into the electrical box 210. Each wire opening 50 in the rear wall 34 is aligned with a corresponding cable opening 40 in the front wall 32 to minimize bending of wires 230 when passing the wires from the internal cavity 37 of the connector housing 30 into the electrical box 210. The front wall cable openings 40 aligned with the wire openings 50 in the rear wall, are both configured to align with box pry-outs 224 when the connector housing is installed within electrical box. As a result, a cable 232 can be passed through the pry-out opening through the cable opening 40, and wires 230 within the cable 232 can pass through the wire opening 50 into the electrical box, as seen in FIGS. 20-22. Further, the bottom wall 38 of the connector housing 30 may include a pair of parallel guide fins 70, seen in FIGS. 6, 11 and 13, that are aligned with each cable opening 40 and its corresponding wire opening 50 to act as a guide to position a cable within the internal cavity 37, as seen in FIG. 22.

Referring to FIGS. 2, 6, 9 and 10, the top wall 36 of the connector housing 30 includes one or more cutouts 60 that provide access to the internal cavity 37 of the connector housing 30. In the exemplary implementation shown, the top wall 36 has two cutouts 60. Each cutout is generally rectangular in shape and extends from a point proximate the front wall 32 toward the rear wall 34 as shown. While the cutouts are shown as rectangular in shape, one skilled in the art would readily recognize that the cutouts can be in any shape suitable to provide access to the internal cavity 37 of the connector housing 30. Each cutout 60 has a mounting bracket 62, best seen in FIGS. 2, 6 and 13, that is used to secure the base portion 14 of the cable retaining member 12 to the connector housing 30 and allow the one or more legs 16 of the cable retaining member 12 to pass into the internal cavity 37 of the connector housing 30. Extending from each cutout 60 is a pair of fins 72 that stiffen the top wall 36 and act as a guide for the cable retaining member 12. While the top wall is shown with the cutouts 60 and mounting bracket 62, one skilled in the art would readily appreciate that the bottom wall 38 may include the cutouts 60 and the mounting brackets used to secure the base portion 14 of the cable retaining member 12 to the connector housing 30 and allow the one or more legs 16 of the cable retaining member 12 to pass into the internal cavity 37 of the connector housing 30. In another embodiment, the side walls, if implemented, may include the cutouts and the mounting brackets used to secure the base portion 14 of the cable retaining member 12 to the connector housing 30 and allow the one or more legs 16 of the cable retaining member 12 to pass into the internal cavity 37 of the connector housing 30.

In this exemplary implementation, the mounting bracket 62 is positioned in the cutout 60 proximate the front wall 32. The mounting bracket 62 has an upper surface 64, seen in FIGS. 6 and 12, configured to permit the base portion 14 of the cable retaining member 12 to rest on the mounting bracket 62. The mounting bracket 62 includes aperture 66, e.g., a threaded opening, in the upper surface 64 for receiving a mounting screw 68 that passes through aperture 18 in the cable retaining member 12 and is threaded into an aperture 66 in the mounting bracket 62 to secure the base portion 14 of the cable retaining member 12 to the mounting bracket.

Figure 14:
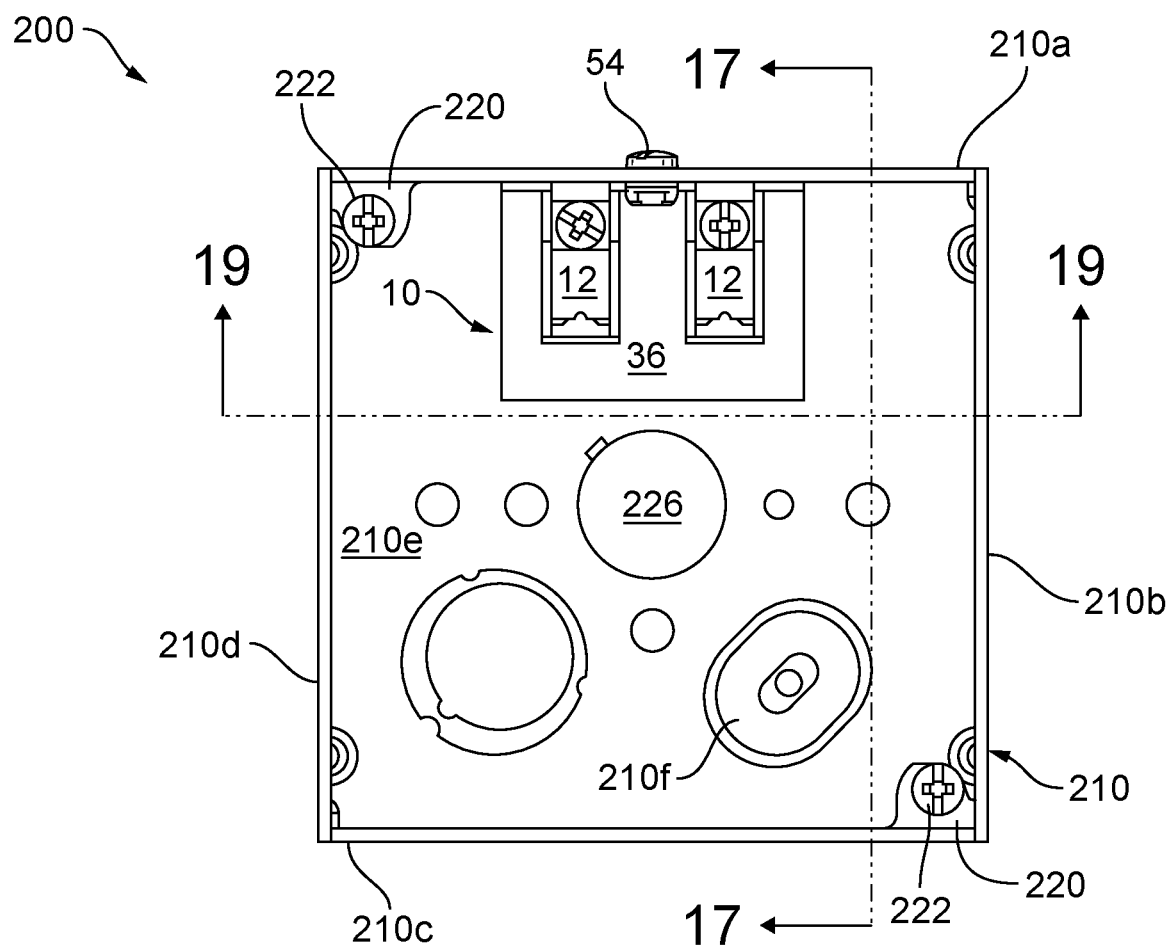
FIG. 14 is a top plan view of the electrical box assembly of FIG. 1.
Figure 15:
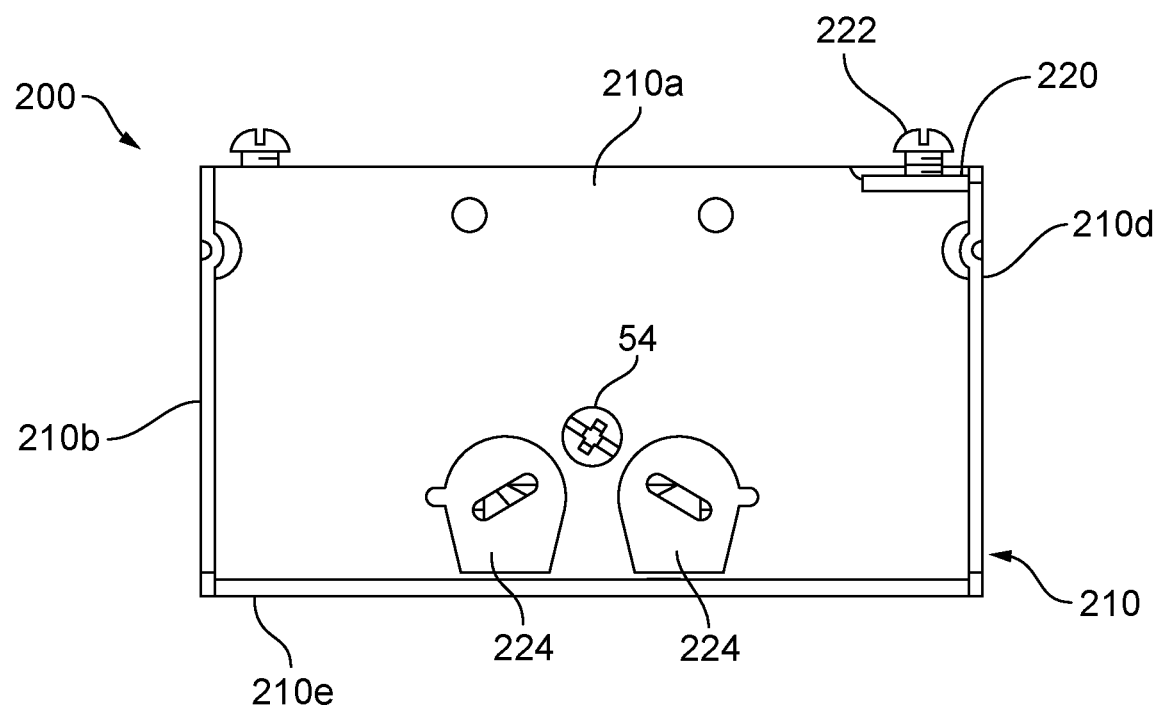
FIG. 15 is a side view of the electrical box assembly of FIG. 14.

Referring to FIGS. 1 and 14-22, an exemplary embodiment of an electrical box assembly according to the present disclosure is shown. In this exemplary embodiment, the electrical box assembly 200 includes an electrical box 210 and one or more cable connectors 10. The electrical box 210 has four sides 210a-210d and a bottom 210e. The electrical box 210 can be fabricated from metal, e.g., steel or galvanized steel, or from non-metallic materials, such as plastic. An example of a suitable plastic material is injection molded thermoplastic. In the embodiment shown, the electrical box 210 is a conventional 4×4 square box (or what is also known in the industry as a 4" square box or a 1900 box), however any suitable sized electrical box may be used for the present disclosure. For example, additional multi-gang boxes, such as a 3 gang box or raceways, may be used for the electrical box of the present disclosure. Further, the depth of the electrical box 210 may vary. For example, the electrical box may be 1¼ inches, 1½ inches, 2⅛ inches, or 3½ inches in depth. The electrical box 210 may also include one or more mounting tabs 220 with threaded or tapped mounting holes, where threaded screws 222 (e.g., 8/32 machine screws) can be inserted to secure a cover, e.g., a blank cover, a switch cover or a receptacle cover, or to secure an extension ring or plaster ring to the electrical box 210. The electrical box 210 may include one or more cable entrance pry-outs 224, seen in FIGS. 15 and 16, that when removed create an opening in the electrical box 210 to permit electrical cables to be inserted into the electrical box 210. The electrical box 210 may also include one or more knock-outs 226, seen in FIGS. 14 and 16, used to secure cable clamps or cable connectors to the box housing. The knock-outs 226 can come in many sizes. For example, the knock-outs 226 can be ½ inch, ¾ inch, 1 inch or greater in diameter. To connect the electrical box 210 to electrical ground, a ground screw aperture may be included in the electrical box 210. In conventional 4×4 electrical boxes, the ground screw aperture is typically on a raised surface 210f of the bottom 210e of the electrical box 210, as seen in FIGS. 1, 14 and 22. The ground screw aperture is typically a threaded or tapped hole for insertion of a ground screw, e.g., an 8/32 machine screw, that is typically color coded as green.

Figure 16:
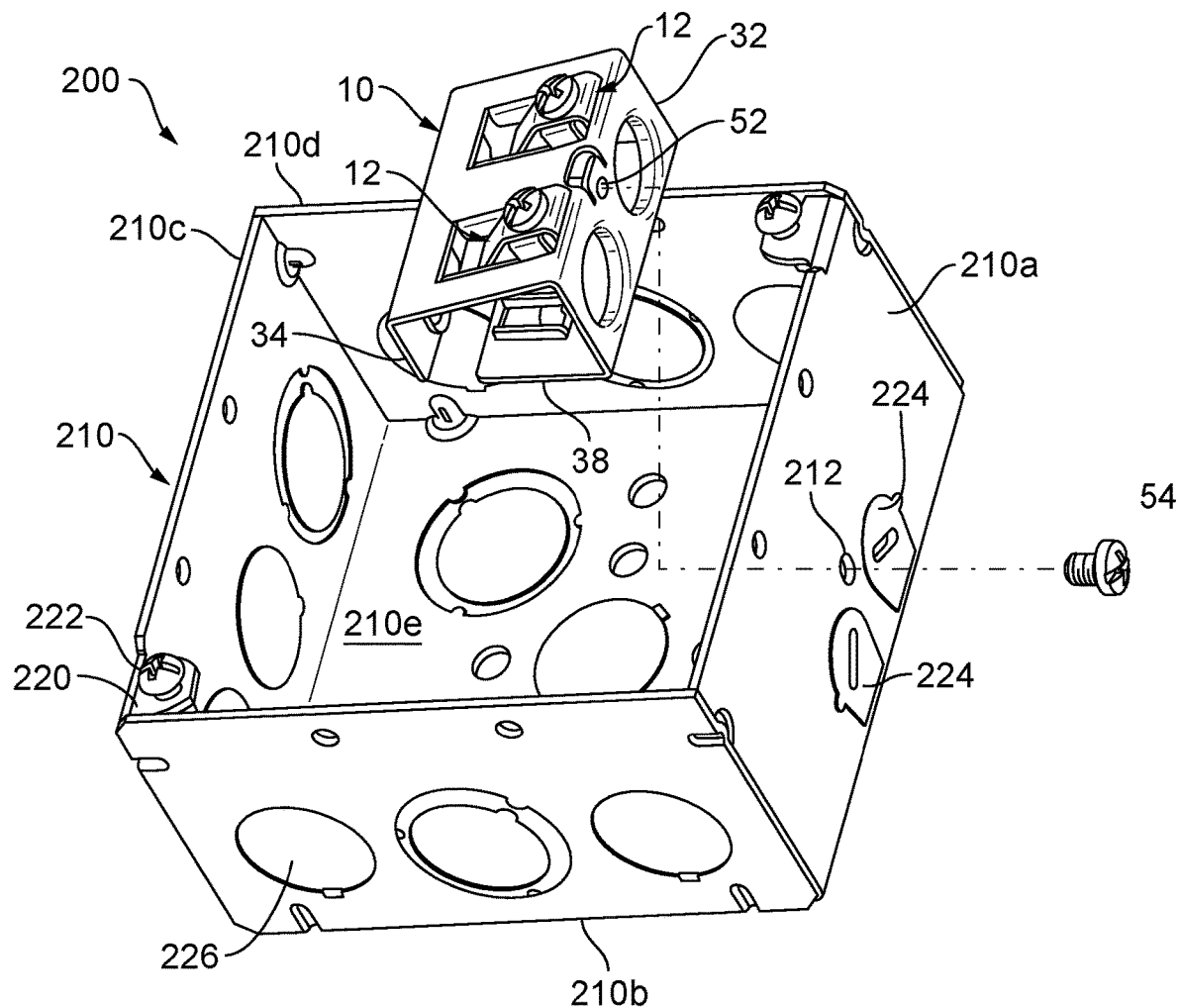
FIG. 16 is an exploded perspective view of the electrical box assembly of FIG. 14.
Figure 19:
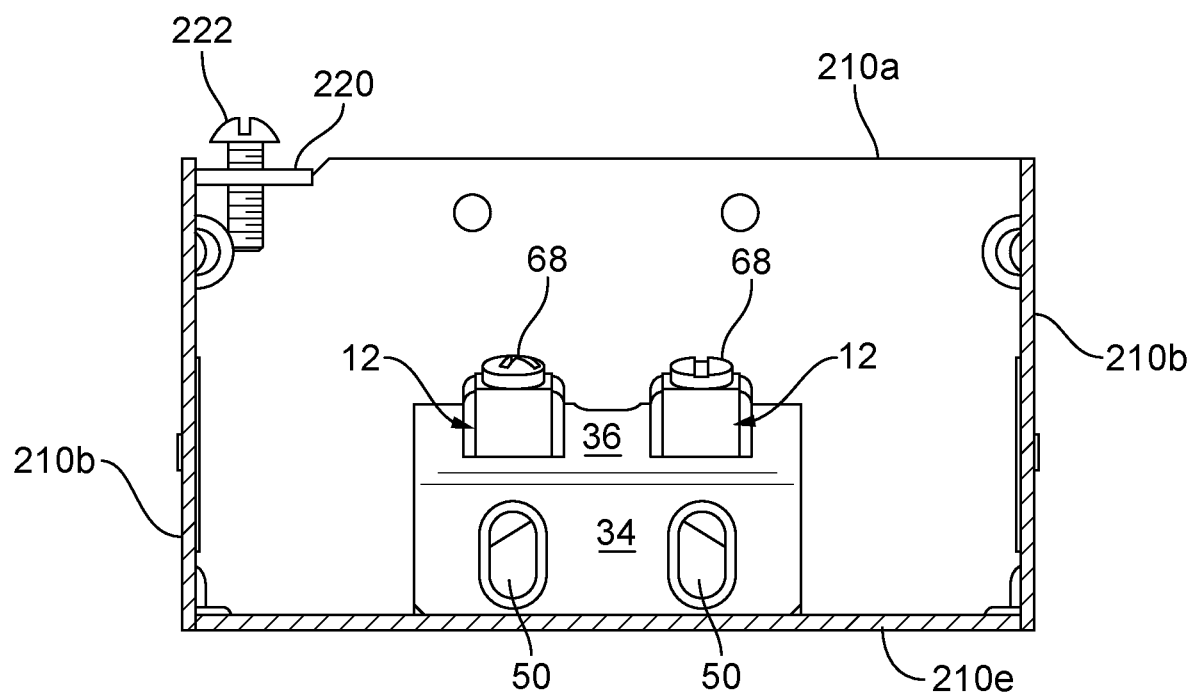
FIG. 19 is a cross-sectional view of the electrical box assembly of FIG. 14 taken along line 19-19.

Referring to FIGS. 14-19, one or more cable connectors 10 of the present disclosure can be mounted into the electrical box 210. In this exemplary embodiment, to mount the cable connector 10 to the electrical box 210, the front wall 32 of the connector housing 30 is positioned against a side wall of the box housing having cable entrance pry-outs 224, for example side wall 210a. The mounting hole 52 in the connector housing 30 is aligned with opening 212 in side wall 210a, so that the threaded portion of fastener 54 can pass through the opening 212, and can be threaded into mounting hole 52 to secure the connector housing 30 to the electrical box 210, as seen in FIGS. 16-18. When secured within the connector housing 30, the bottom wall 38 of the connector housing rests on or is adjacent to the bottom wall 210e of the electrical box 210, as seen in FIG. 19.

Referring to FIGS. 20-22, the operation of the cable connector 10 according to the present disclosure will be described. When wires 230 of an electrical cable 232 (or an electrical cable if the cable sheathing is not removed prior to installation) are passed through the pry-out openings in the electrical box 210, through the cable opening 40 in connector housing 30 and through the corresponding wire opening 50 the cable sheathing 234 enters the internal cavity 37 of the connector housing 30. As the cable 232 moves forward within the internal cavity 37, the end portion 16b of each leg 16 of the cable retaining member 12 can engage the cable sheathing 234. As described above, the retaining member 12 is a flexible member that is able to flex (typically upward) while the electrical cable 232 passes into the internal cavity 37 of the connector housing 30 imparting little resistance to the forward advancement of the cable 232 within the internal cavity, while imparting sufficient resistance to rearward movement of the cable to prevent withdrawal of the cable from the housing. Thus, releasably securing the cable 232 in the connector housing 30.

Turning to FIGS. 23-26, another exemplary embodiment of an electrical box assembly according to the present disclosure is shown. In this exemplary embodiment, the electrical box assembly 300 includes an electrical box 210 having four sides 210a-210d and a bottom 210e, a cable connector 10, and a box separator 350. The electrical box 210 is similar to the electrical box described above, and the cable connector 10 is similar to the cable connector described above, and for ease of description are not described again.

The box separator 350 is secured within the electrical box 210 to create at least two wiring connection compartments. In the embodiment shown, the box separator 350 creates two wiring connection compartments; an AC wiring connection compartment 352 and a low voltage wiring connection compartment 354. In this exemplary implementation, as will be described in more detail below, wires or conductors can pass from one compartment to another compartment through one or more wire passages in the box separator 350. For example, wires can pass from the AC wiring connection compartment 352 to the low voltage wiring connection compartment 354, or wires can pass from the low voltage wiring connection compartment 354 to the AC wiring connection compartment 352.

Continuing to refer to FIGS. 23-26, the box separator 350 can be fabricated from metal, e.g., steel or galvanized steel, or from non-metallic materials, such as plastic. An example of a suitable plastic material is injection molded thermoplastic. In this exemplary implementation, the box separator 350 is a U shaped member having two parallel plates 360 and 362, and a connecting wall 364, best seen in FIG. 26, that form a wire passage channel 366. Plate 360 includes a wire passage 370, such as a wire passing slot, an aperture or other opening or passageway, which is configured and dimensioned to allow one or more wires, e.g., AC line voltage wires, or low voltage wires, to pass through the plate 360. To prevent potential damage to wires passing through wire passage 370, the edges of the wire passage 370 can include a flange 370a that is rounded to a smooth surface, seen in FIG. 23, so that insulation around wires passing between low voltage wiring connection compartment 354 and wire passage channel 366 does not become damaged to a point where wire conductors within the insulation become exposed to the environment. In another embodiment, especially when the box separator 350 is made of metal, an insulating sleeve or member (not shown) may be secured to the wire passage 370 by, for example, an adhesive such as glue or epoxy.

Figure 23:
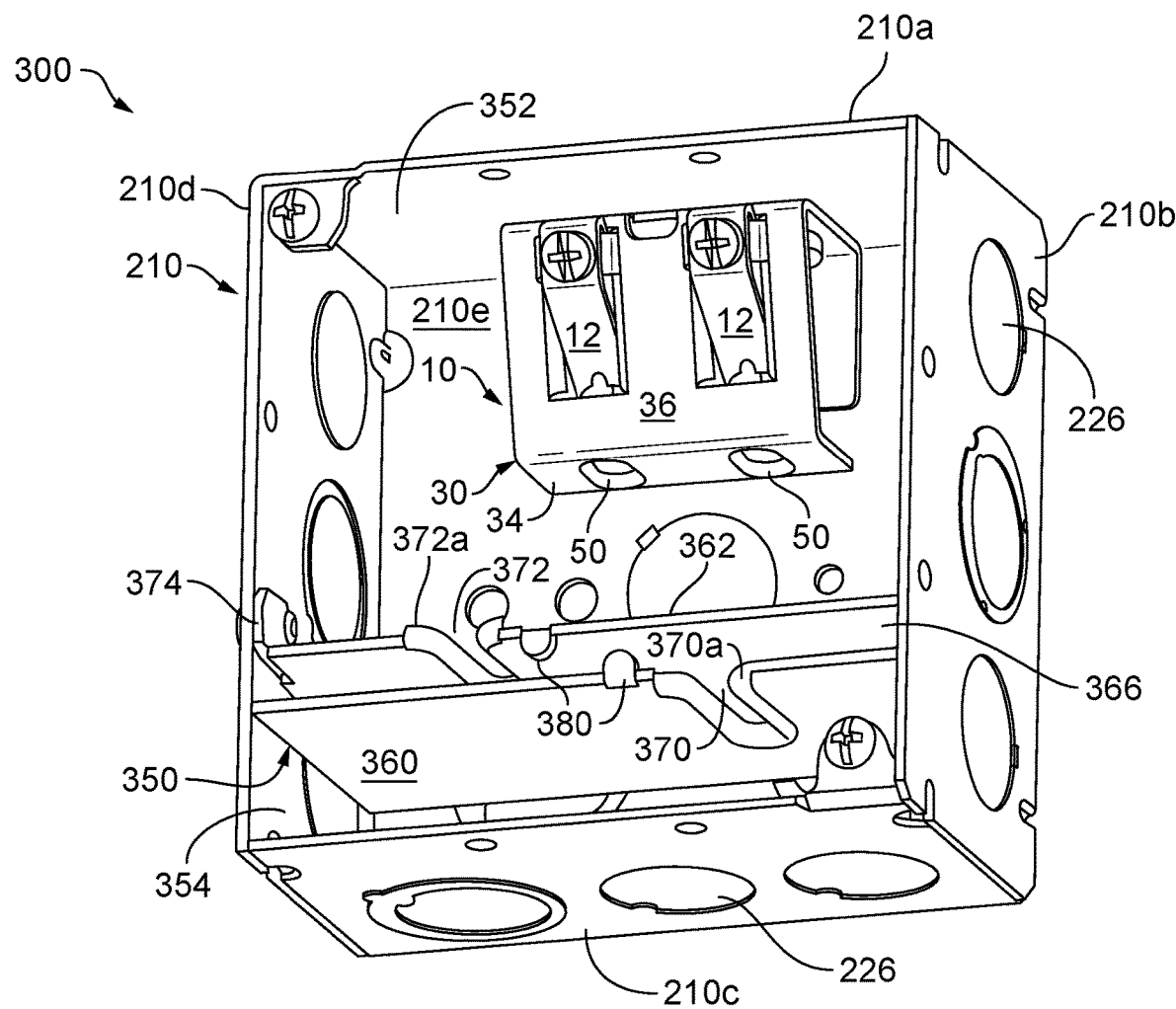
FIG. 23 is a perspective view of another exemplary embodiment of an electrical box assembly according to the present disclosure, illustrating a cable connector and a box separator positioned within an electrical box.
Figure 24:
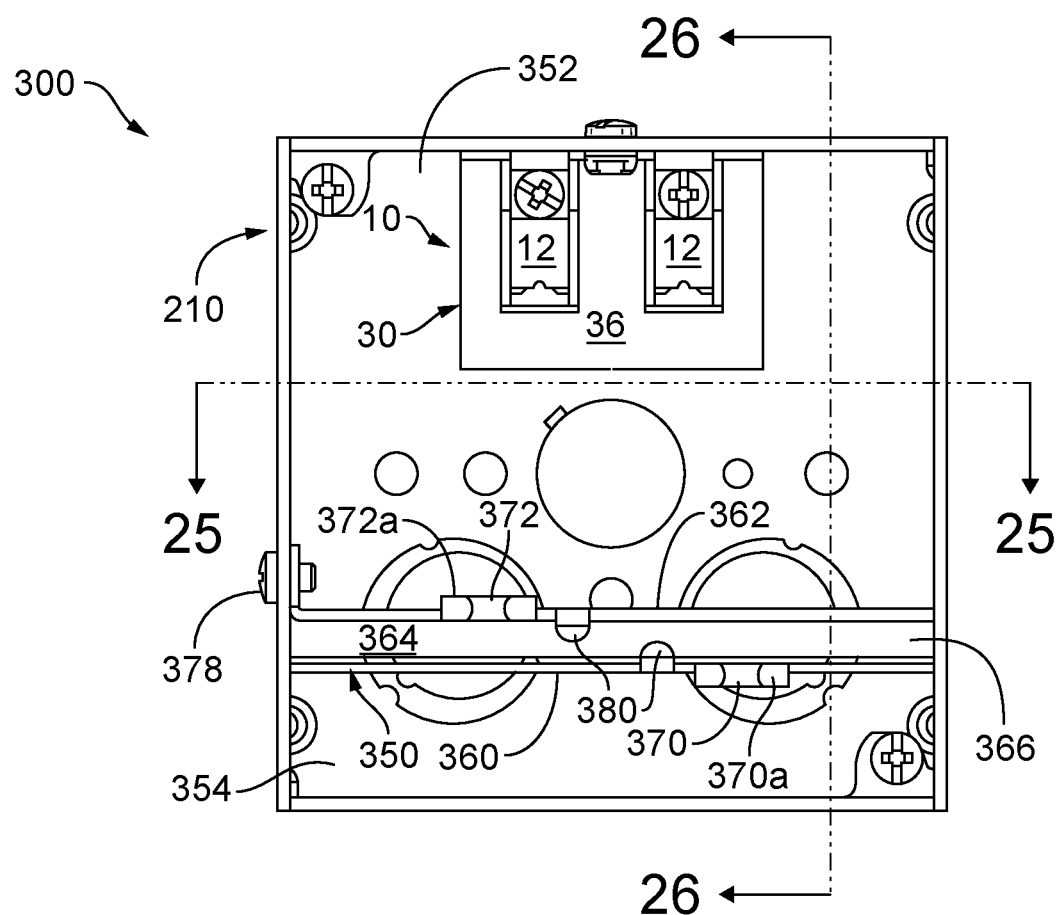
FIG. 24 is a top plan view of the electrical box assembly of FIG. 23.

Similar to plate 360, plate 362 includes a wire passage 372, such as a wire passing slot, an aperture or other opening or passageway, which is configured and dimensioned to allow one or more wires, e.g., AC line voltage wires or low voltage wires, to pass through the plate 362. However, as seen in FIGS. 23 and 24, the wire passage 370 in plate 360 is preferably offset from wire passage 372 in plate 362 to eliminate direct wire access across the box separator 350 to either compartment 352 or 354 so as to make it difficult to have an inadvertent cross-over of wires into the wrong compartment. To prevent potential damage to wires passing through wire passage 372, the edges of the wire passage 372 can include a flange 372a that is rounded to a smooth surface, seen in FIGS. 23 and 25, so that insulation around wires passing between low voltage wiring connection compartment 354 and the wire passage channel 366 does not become damaged to a point where wire conductors within the insulation become exposed to the environment. In another embodiment, especially when the box separator 350 is made of metal, an insulating sleeve or member (not shown) may be secured to the wire passage 372 by, for example, an adhesive such as glue or epoxy.

Continuing to refer to FIGS. 23-26, plate 362 also includes a mounting tab 374 extending at a right angle from an upper portion of the plate 362, as shown in FIG. 26. The mounting tab 374 includes a threaded or tapped mounting hole 376, and is used to facilitate the securing of the box separator 350 within the electrical box 210. More specifically, a mounting screw 378, seen in FIGS. 24 and 25, can be inserted through an aperture in a side wall, e.g., side wall 210a, 210b, 210c and/or 210d, of the electrical box 210 into the threaded mounting hole 376 and tightened to secure the box separator 350 to the electrical box 210. In another embodiment, one end of plate 360 may include a mounting tab 374 extending at a right angle from an upper portion of the plate, and one end of plate 362 may include a mounting tab 374 extending at a right angle from an upper portion of the plate. Preferably, the mounting tab 374 on plate 360 is at an opposite end and side from tab 374 on plate 362. Each plate could then be secured to the electrical box 210. In such an implementation, the box separator 350 may or may not include the connecting wall 364. In still other embodiments, the box separator 350 can be secured to the electrical box 210 by, for example, welding, a spring action snap-in structure, bending mounting tabs in the electrical box over corresponding flanges in the box separator, and/or by including apertures in the connecting wall 364 of the box separator 350 and threaded or tapped mounting holes in the bottom 210e of the electrical box 210 that are aligned with the apertures in the bottom connecting wall 364, and inserting threaded screws to the bottom 210e of the electrical box 210.

As described above, in the exemplary embodiment shown in FIGS. 23-26, wires or conductors can pass from one compartment to another compartment. For example cables can be connected to the electrical box 210 using cable connector 10 aligned with pry-outs 224, or other cable connectors or clamps in knock-outs 226. In this exemplary embodiment, the one or more cables can be metal clad power, control and signal (MC-PCS) type cables with an armored sheathing. Such MC-PCS cables include AC line voltage wires for supplying AC power, and low voltage control or signal wires for controlling devices, such as solid state dimmer switches. Using MC-PCS type cables, low voltage wires in the cable can pass from the AC wiring connection compartment 352 through the wire channel 366 and into the low voltage wiring connection compartment 354. As another example, if the cables are connected to the low voltage wiring compartment 354 side of the electrical box 210, AC line voltage wires can pass from the low voltage wiring connection compartment 354 through the wire channel 366 and into the AC wiring connection compartment 352. In another embodiment, one or more cables connected to the electrical box 210 can be a standard AC line voltage cables, such as 12/2 BX cables, and one or more cables can be a low voltage cable, such as shielded two conductor low voltage control cables. Using separate AC line voltage cabling and low voltage cabling, low voltage wires in the AC wiring connection compartment 352 can pass through the wire channel 366 and into the low voltage wiring connection compartment 354. Similarly, AC line voltage wires in the low voltage wiring connection compartment 354 can pass through the wire channel 366 and into the AC wiring connection compartment 352.

To ensure wires within wire channel 366 remain within the wire channel, each plate 360 and 362, may include one or more wire catching prongs 380 extending from a top surface of the respective plate into the channel 366. Preferably, the wire catching prongs 380 are bendable tabs cut in each plate 360 and 362 so that the wire catching prongs 380 are initially parallel to the respective plates and then after all wires are positioned within the wire channel 366, the wire catching prongs 380 can be bent towards the wire channel 366 to about 90 degrees relative to the respective plate. In another embodiment, the wire catching prongs 380 may be welded to the plate or may be snap fitted to the plate.

As noted above, the electrical box 210, cable connector 10, and box separator 350 can be made of metal or non-metallic materials. In some combinations, the electrical box 210, cable connector 10, and box separator 350 can be made of the same material, e.g., metal or non-metallic material. In other combinations, for example, the electrical box 210 and cable connector 10 can be made of one material, e.g., non-metallic material, and the box separator 350 can be made of another material, e.g., metal. If the box separator 350 is made of metal or other conductive material, the box separator when connected to electrical ground, by for example mounting tab 374 and threaded screw 378, can provide additional shielding for the low voltage wire connections to help minimize negative effects from AC transients on the AC line voltages within the box assembly 300.

As described above, the box separator 350 may be a U-shaped member. However, the present disclosure contemplates other shapes and configurations of the box separator that creates two or more compartments within the electrical box and provide for the passing of wires between the compartments. For example, the box separator may be a single plate with knockout, grommets or other openings through which wires can pass from one compartment to another compartment.

Figure 27:
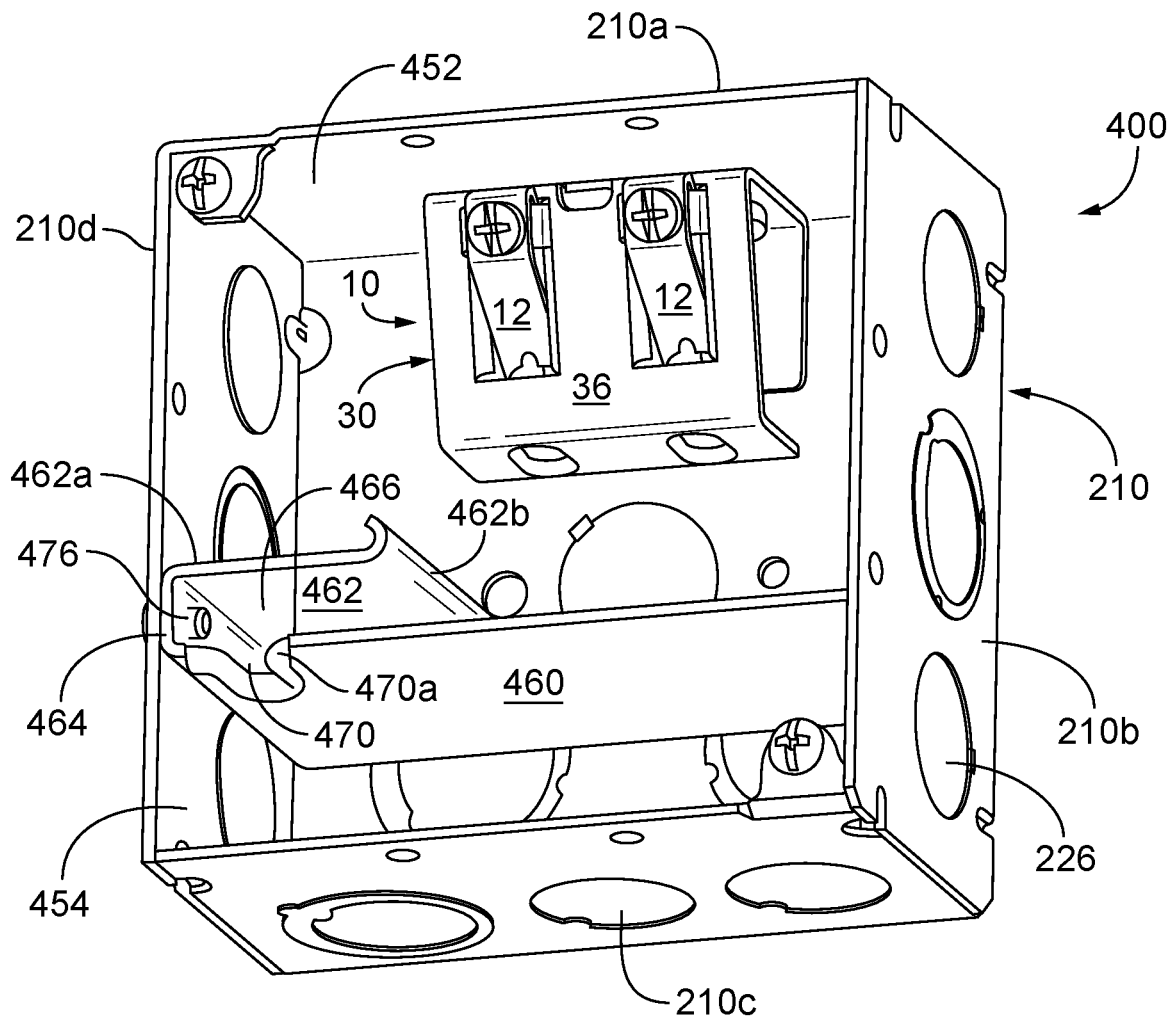
FIG. 27 is a perspective view of another exemplary embodiment of an electrical box assembly according to the present disclosure, illustrating a cable connector and a box separator positioned within an electrical box.
Figure 28:
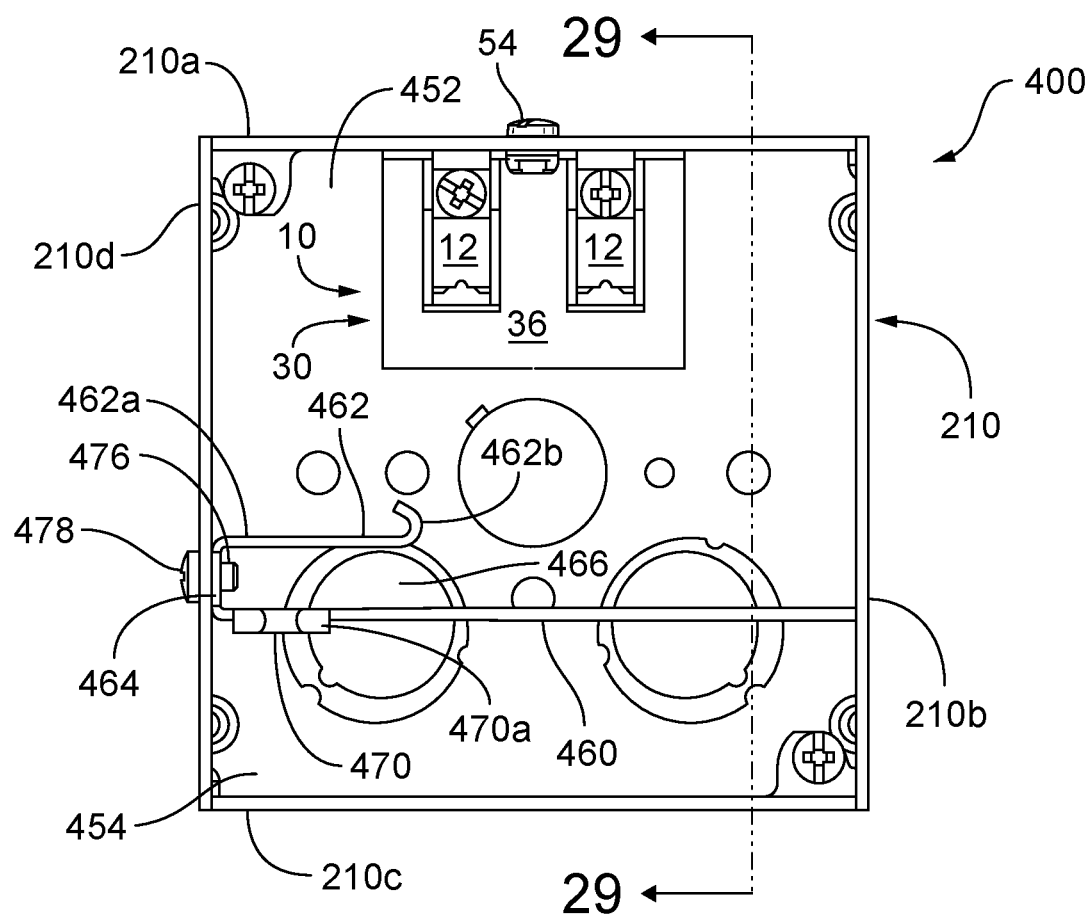
FIG. 28 is a top plan view of the electrical box assembly of FIG. 27.
Figure 29:
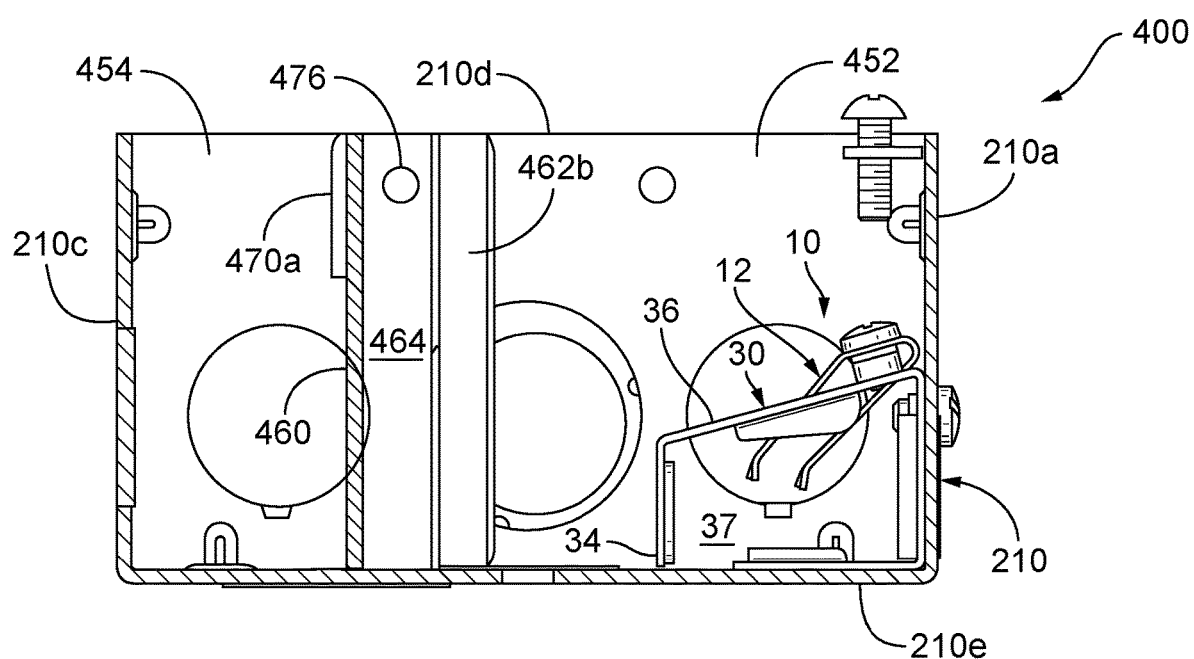
FIG. 29 is a cross-sectional view of the electrical box assembly of FIG. 28 taken along line 29-29.

Turning to FIGS. 27-29, another exemplary embodiment of an electrical box assembly according to the present disclosure is shown. In this exemplary embodiment, the electrical box assembly 400 includes an electrical box 210 having four sides 210a-210d and a bottom 210e, a cable connector 10, and a box separator 450. The electrical box 210 and the cable connector 10 are similar to the electrical box and cable connector described above, and for ease of description are not described again.

The box separator 450 is secured within the electrical box 210, as shown in figures, to create at least two wiring connection compartments. In the embodiment shown, the box separator 450 creates two wiring connection compartments; an AC wiring connection compartment 452 and a low voltage wiring connection compartment 454. In this exemplary embodiment, as will be described in more detail below, wires or conductors can pass from one compartment to another compartment through one or more wire passages in the box separator 450. For example, wires can pass from the AC wiring connection compartment 452 to the low voltage wiring connection compartment 454, or wires can pass from the low voltage wiring connection compartment 454 to the AC wiring connection compartment 452.

The box separator 450 can be fabricated from metal, e.g., steel or galvanized steel, or from non-metallic materials, such as plastic. An example of a suitable plastic material is injection molded thermoplastic. In this exemplary implementation, the box separator 450 has two plates 460 and 462 and a connecting wall 464 that form a wire passage channel 466. Plate 460 includes a wire passage 470, such as a wire passing slot, an aperture or other opening or passageway, which is configured and dimensioned to allow one or more wires, e.g., AC line voltage wires or low voltage wires, to pass through the plate 460. To prevent potential damage to wires passing through wire passage 470, the edges of the wire passage 470 can include a flange 470a that is rounded to a smooth surface, seen in FIG. 27, so that insulation around wires passing between one compartment, e.g., the low voltage wiring connection compartment 454, and the wire passage channel 466 do not become damaged to a point where wire conductors within the insulation become exposed to the environment. In another embodiment, especially when the box separator 450 is made of metal, an insulating sleeve or member (not shown) may be secured to the wire passage 470 by, for example, an adhesive such as glue or epoxy.

Plate 462 is a partial plate wall having one end 462a extending from the connecting wall 464 and a free end 462b a distance from the connecting wall that provides access to the wire passage channel 466. To prevent potential damage to wires passing from the AC wiring connection compartment 452 into the wire passage channel 466, the free end 462b can be rounded to a smooth surface, so that insulation around wires passing between one compartment, e.g., the AC wiring connection compartment 352, and the wire passage channel 466 do not become damaged to a point where wire conductors within the insulation become exposed to the environment. In another embodiment, especially when the box separator 450 is made of metal, an insulating sleeve or member (not shown) may be secured or attached to the free end 462b of plate 462, by, for example, an adhesive such as glue or epoxy.

Continuing to refer to FIGS. 27-29, to secure the box separator 450 to the electrical box 210, the connecting wall 464 can include a threaded or tapped mounting hole 476, and a mounting screw 478, seen in FIG. 28, can be inserted through an aperture in a side wall, e.g., side wall 210a, 210b, 210c and/or 210d, of the electrical box 210 and into the threaded mounting hole 476 and tightened to secure the box separator 450 to the electrical box 210. In other embodiments, the box separator 450 can be secured to the electrical box 210 by, for example, welding, a spring action snap-in structure, bending mounting tabs in the box housing over corresponding flanges in the box separator, and/or threaded or tapped mounting holes in the bottom 210e of the box housing 210 that are aligned with the apertures in a connecting wall 464 extending between the plates at the bottom of the box separator 450, and inserting threaded screws to the bottom 210e of the electrical box 210.

As described above, in the exemplary embodiment shown in FIGS. 27-29, wires or conductors can pass from one compartment to another compartment. For example, cables can be connected to the electrical box 210 using cable connector 10 aligned with pry-outs 224, or other cable connectors or clamps in knock-outs 226. In this exemplary embodiment, the one or more cables can be metal clad power, control and signal (MC-PCS) type cables with an armored sheathing. Such MC-PCS cables include AC line voltage wires for supplying AC power, and low voltage control or signal wires for controlling devices, such as solid state dimmer switches. Using MC-PCS type cables, low voltage wires in the cable can pass from the AC wiring connection compartment 452 through the wire channel 466 and into the low voltage wiring connection compartment 454. As another example, if the cables are connected to the low voltage wiring compartment 454 side of the electrical box 210, AC line voltage wires can pass from the low voltage wiring connection compartment 454 through the wire channel 466 and into the AC wiring connection compartment 452. In another embodiment, one or more cables connected to the electrical box 210 can be a standard AC line voltage cables, such as 12/2 BX cables, and one or more cables can be a low voltage cable, such as shielded two conductor low voltage control cables. Using separate AC line voltage cabling and low voltage cabling, low voltage wires in the AC wiring connection compartment 452 can pass through the wire channel 466 and into the low voltage wiring connection compartment 454. Similarly, AC line voltage wires in the low voltage wiring connection compartment 454 can pass through the wire channel 466 and into the AC wiring connection compartment 452.

As noted above, the electrical box 210, cable connector 10, and box separator 450 can be made of metal or non-metallic materials. In some combinations, the electrical box 210, cable connector 10, and box separator 450 can be made of the same material, e.g., metal or non-metallic material, and in other combinations, for example, the electrical box 210 and cable connector 10 can be made of one material, e.g., non-metallic material, and the box separator 450 can be made of another material, e.g., metal. If the box separator 450 is made of metal or other conductive material, the box separator when connected to electrical ground, by for example mounting tab 474 and threaded screw 478, can provide additional shielding for the low voltage wire connections to help minimize negative effects from AC transients on the AC line voltages within the box assembly 400.

While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical cable connector for an electrical box, the electrical cable connector comprising:

a housing defining a space configured to receive an electrical cable, the housing having means for attaching the housing to an interior of the electrical box from an exterior of the electrical box; and at least one flexible cable retaining member secured to or integrally formed into the housing and extending into the space.

2. The electrical cable connector according to claim 1, wherein the at least one cable retaining member comprises at least one leg that flexes when the electrical cable is received in the space.

3. The electrical cable connector according to claim 1, wherein the at least one cable retaining member comprises a plurality of legs, wherein each leg flexes when the electrical cable is received in the space.

4. An electrical cable connector comprising:

a housing attachable to an interior of one of a plurality of walls of an electrical box from an exterior of the electrical box, the housing defining a space and configured to receive an electrical cable in the space; and at least one cable retaining member secured to or integrally formed into the housing and extending into the space such that when the electrical cable is received in the space at least a portion of the cable retaining member engages the electrical cable and holds the electrical cable in the space.

5. The electrical cable connector according to claim 4, wherein the at least one cable retaining member comprises at least one leg.

6. The electrical cable connector according to claim 5, wherein the at least one leg is a flexible leg that flexes when the electrical cable is received in the space.

7. The electrical cable connector according to claim 4, wherein the at least one cable retaining member comprises a plurality of legs.

8. The electrical cable connector according to claim 7, wherein each of the plurality of legs are flexible legs, wherein each leg flexes when the electrical cable is received in the space.

9. The electrical cable connector according to claim 4, wherein the housing is attachable to the interior of the one of a plurality of walls using a fastener.

10. The electrical cable connector according to claim 9, wherein the fastener comprises a threaded screw.

11. An electrical cable connector comprising:

a housing mountable to an interior of one of a plurality of walls of an electrical box from an exterior of the electrical box, the housing having a cable holding space, the housing being configured to receive in the cable holding space a portion of an electrical cable passing through the one of a plurality of walls, and the housing being configured to prevent sheathing of the receive electrical cable from passing through the housing; and at least one cable retaining member secured to or integrally formed into the housing and extending into the cable holding space such that when the electrical cable is received in the cable holding space at least a portion of the cable retaining member engages the sheathing of the electrical cable to hold the electrical cable in the space and prevent withdrawal of the electrical cable from the space.

12. The electrical cable connector according to claim 11, wherein the at least one cable retaining member comprises at least one leg.

13. The electrical cable connector according to claim 12, wherein the at least one leg is a flexible leg that flexes when the electrical cable is received in the cable holding space.

14. The electrical cable connector according to claim 11, wherein the at least one cable retaining member comprises a plurality of legs.

15. The electrical cable connector according to claim 14, wherein each of the plurality of legs are flexible legs, wherein each leg flexes when the electrical cable is received in the cable holding space.

16. The electrical cable connector according to claim 1, wherein the means for attaching the housing comprises a fastener.

17. The electrical cable connector according to claim 16, wherein the fastener comprises a threaded screw.

18. The electrical cable connector according to claim 11, wherein the housing is mountable to the interior of the one of a plurality of walls using a fastener.

19. The electrical cable connector according to claim 18, wherein the fastener comprises a threaded screw.

* * * * *